(12) United States Patent
Kim et al.

(10) Patent No.: US 12,533,432 B2
(45) Date of Patent: Jan. 27, 2026

(54) APPARATUS FOR DISINFECTION OF OCCUPIED SPACES

(71) Applicant: Glint Photonics, Inc., Burlingame, CA (US)

(72) Inventors: Andrew Kim, San Jose, CA (US); Chadwick Casper, San Francisco, CA (US)

(73) Assignee: Glint Photonics, Inc., Burlingame, CA (US)

( * ) Notice: Subject to any disclaimer, the term of this patent is extended or adjusted under 35 U.S.C. 154(b) by 581 days.

(21) Appl. No.: 17/306,277

(22) Filed: May 3, 2021

(65) Prior Publication Data

US 2021/0393819 A1 Dec. 23, 2021

Related U.S. Application Data

(60) Provisional application No. 63/019,342, filed on May 3, 2020.

(51) Int. Cl.
*A61L 2/10* (2006.01)
*A61L 2/08* (2006.01)

(52) U.S. Cl.
CPC .................. *A61L 2/10* (2013.01); *A61L 2/084* (2013.01); *A61L 2202/11* (2013.01); *A61L 2202/14* (2013.01); *A61L 2202/17* (2013.01); *A61L 2202/25* (2013.01)

(58) Field of Classification Search
CPC .................................. A61L 2/10; A61L 2/084
See application file for complete search history.

(56) References Cited

U.S. PATENT DOCUMENTS

| | | | |
|---|---|---|---|
| 10,010,634 | B2 | 7/2018 | Bonutti et al. |
| 2007/0053188 | A1 | 3/2007 | New et al. |
| 2010/0053621 | A1 | 3/2010 | Olson et al. |
| 2011/0152752 | A1 | 6/2011 | Dacey, Jr. et al. |
| 2012/0135512 | A1* | 5/2012 | Vasylyev ............... H02S 40/22 422/186.3 |
| 2017/0028088 | A9 | 2/2017 | Maxik et al. |
| 2017/0080117 | A1 | 3/2017 | Gordon |

(Continued)

FOREIGN PATENT DOCUMENTS

| | | |
|---|---|---|
| CN | 212593162 U | 2/2021 |
| ES | 1254115 | 10/2020 |

(Continued)

OTHER PUBLICATIONS

International Search Report dated Aug. 26, 2021 in related PCT/US2021/030451.

*Primary Examiner* — Kevin Joyner
(74) *Attorney, Agent, or Firm* — David J. Thibodeau, Jr; VLP Law Group LLP

(57) ABSTRACT

A Selected-area Ultraviolet Disinfection (SUD) system which enables increased frequency of ultraviolet light treatment of spaces by improving the convenience, cost, safety, and/or efficacy. The core utility of the SUD system is to frequently and safely disinfect spaces where occupants are conducting their normal activities, enabled by a system constructed with a disinfecting light source that can direct and irradiate only selected areas (and corresponding volumes) that sensing and control components have determined are safe to disinfect, i.e. are not currently occupied.

9 Claims, 17 Drawing Sheets

(56) References Cited

U.S. PATENT DOCUMENTS

| | | |
|---|---|---|
| 2017/0246329 A1 | 8/2017 | Lloyd |
| 2018/0185527 A1 | 7/2018 | Lalicki et al. |
| 2019/0365937 A1* | 12/2019 | Lamoureux ............ H05B 45/18 |
| 2020/0011995 A1 | 1/2020 | Send et al. |
| 2020/0061223 A1 | 2/2020 | Hallack |
| 2020/0188543 A1 | 6/2020 | Etter et al. |
| 2020/0215213 A1 | 7/2020 | Bryant et al. |
| 2020/0225088 A1* | 7/2020 | Babaie .................... G01J 1/429 |

FOREIGN PATENT DOCUMENTS

| | | |
|---|---|---|
| IN | 202021015830 | 4/2020 |
| WO | 2017185138 A1 | 11/2017 |
| WO | 2019165302 A1 | 8/2019 |

* cited by examiner

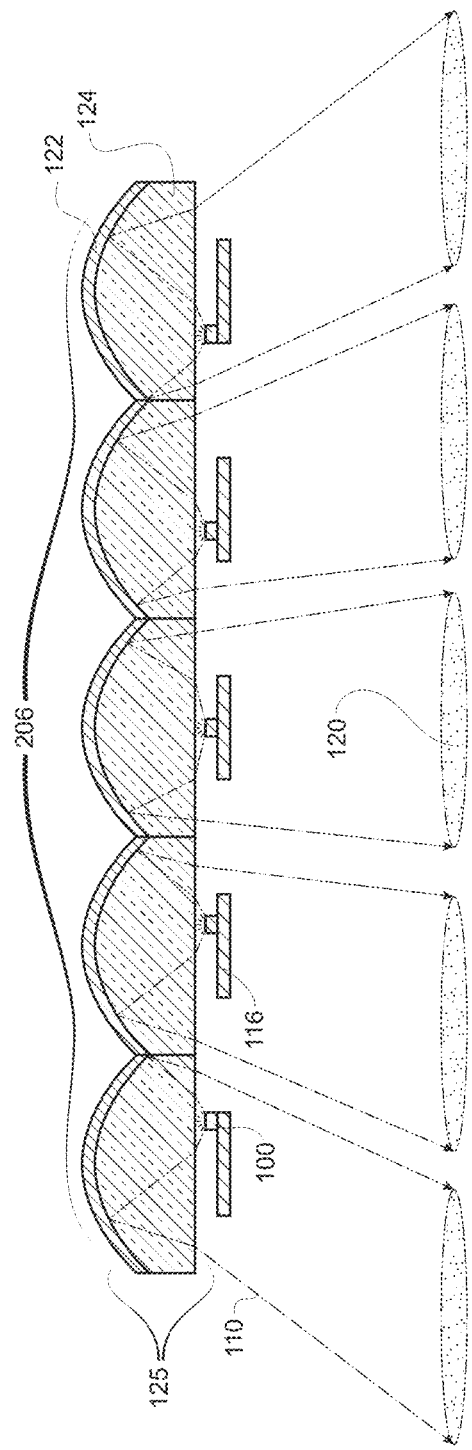

APPARATUS FOR DISINFECTION OF OCCUPIED SPACES

CROSS REFERENCE TO RELATED APPLICATIONS

This application claims priority to a U.S. Provisional Patent Application Ser. No. 63/019,342 filed May 3, 2020 entitled "Apparatus for Disinfection of Occupied Spaces", the entire contents of which are hereby incorporated by reference.

TECHNICAL FIELD

This patent application relates to an apparatus for disinfection of occupied spaces using ultraviolet light. The apparatus produces one or more beams of light to disinfect selected areas. Sensors identify occupied areas in a space and control the placement of beams to avoid exposing occupants to ultraviolet light.

BACKGROUND

There are no broadly effective systems for the safe, frequent disinfection of occupied spaces in current use. For terminal cleaning of spaces in hospitals, i.e. procedures used to ensure that an area has been disinfected after the discharge of a patient, manual chemical means are used between patients, suffer from issues of incomplete cleaning and cross-contamination, and are recommended to take 20-45 minutes by the Association for the Healthcare Environment. Targeted cleaning of high-touch surfaces is often performed more frequently by similar manual chemical means. The situation for non-hospital settings is worse, where spaces are rarely if ever fully disinfected.

Several means of no-touch disinfection of unoccupied spaces have been developed, including the use of hydrogen peroxide vapor and ultraviolet germicidal irradiation (UVGI) with light in the UV-C band (100-280 nm). These means are generally designed to disinfect all the exposed surfaces and the air in space and operate as quickly as possible, since the health hazards of these methods require rooms to be vacated and, in the case of hydrogen peroxide vapor, sealed. Many implementations also include occupancy sensors used in an attempt to reduce exposure if people accidentally enter a room during disinfection. UVGI systems that serve this purpose are generally mobile or robotic systems that operate at extremely high (and hazardous) power levels to disinfect a room quickly.

These means of disinfection of unoccupied spaces are a reasonable supplement to conventional terminal cleaning processes. A broad study of hospital ICU cleaning revealed baseline cleaning effectiveness averages just 50%, rising to 82% after comprehensive interventions. High-efficacy, high-power, no-touch disinfection by UVGI or other means has been demonstrated to be effective at completing the disinfection of cleaned surfaces.

However, even if cleaned perfectly at one time, occupied spaces accumulate contamination over time that causes infection rates to increase and current means for continuous disinfection of spaces are limited. Conventional targeted cleaning of high-touch surfaces is only partly effective and unevenly administered, especially outside of hospitals. UVGI lamps are sometimes mounted to limited high-touch areas like keyboards, hoods, and workstations, but are relatively expensive units that cover only fixed, limited areas and have numerous safety concerns; also, the predominant UV-C light source is the low-pressure mercury lamp operating at 254 nm, which is not inherently rugged and has limited lifetime in the high-duty cycle but intermittent operation necessary for frequent or continuous disinfection.

The only common means of frequent disinfection of occupied spaces is to attempt to at least disinfect the air. High-power UVGI systems can be incorporated into HVAC systems to clean recirculating air of pathogenic aerosols, but they do not address in-room contamination of surfaces and only slowly disinfect room air. Upper-room UVGI flood the air volume above 7 feet (for safety) with UV-C light to clean at least a portion of the room air but rely on thorough room air mixing that is rarely achieved and require high ceilings.

SUMMARY

Problem Recognition

In the scope of this disclosure, UVGI is attractive as a disinfection means because it is highly effective at inactivating a wide host of pathogens and does not require rooms to be sealed; however, its human health hazards include damage to the eyes (photokeratitis, photoconjunctivitis) and skin (erythema, skin cancer), so application of UVGI have been limited. Because of health hazards, conventional UVGI primarily is applied in regularly unoccupied areas, such as HVAC systems, or in enclosures, such as enclosed hoods and cabinets, or in evacuated and secured rooms with UV-C flood systems. There are limited UVGI applications in handheld devices and the small, occupancy-sensing devices placed over keyboards and other workstations, but these applications address very small areas. The prior art does not provide a solution to the limitations of conventional UVGI for effectively and safely disinfecting occupied spaces.

In the prior art, ultraviolet fixtures are not able to select areas to irradiate smaller than the full area that they can irradiate. A conventional UVGI fixture comprising a conventional omnidirectional or flood ultraviolet light emitter may incorporate reflectors and other optical components to limit its area of irradiation, but the full area that can be irradiated by that fixture is determined and fixed by the optical components and cannot be moved or reduced to a smaller selected area.

In the prior art, ultraviolet fixtures may feature sensors as a safety or guidance measure, but their utility is limited. A conventional UVGI fixture may also comprise a motion sensor or occupancy sensor to prevent the fixture from irradiating an area when an occupant is present, but the fixture can only turn on or off or dim and cannot reduce the irradiated area to one smaller than the full area. It is also possible that many conventional UVGI fixtures are connected to a room motion or occupancy sensor that turns off all of the fixtures if it detects an occupant, but in this case all of the fixtures are turned off together, the irradiated area is not reduced to one smaller than the full area the fixtures can address, and the fixtures do not operate together as an interconnected system to irradiate selected areas.

In the prior art, it is possible that a plurality of conventional UVGI fixtures, each with its own independent motion sensor or occupancy sensor, are distributed throughout a room and each locally irradiate their respective area if there is no occupant in the area, but each sensor can only turn on or off its associated fixture and such a plurality of conventional UVGI fixtures are not interconnected to work together as a system.

In short, current UVGI light sources are not able to selectively irradiate desired areas and a broadly efficacious means to frequently and safely disinfect meaningful fractions of occupied spaces while occupants go about their normal activities is not currently available. In the context of this disclosure, frequent disinfection refers to a frequency that is greater than that of terminal disinfection and is preferred to be one or more times per day.

Analyzing the limitations of the prior art, UVGI is not currently suitable for frequent or continuous disinfection of occupied spaces because:

UVGI systems use omnidirectional or wide beam angle sources to flood spaces with disinfecting light in the UV-C band (100-280 nm), but UV-C light is harmful to people, UVGI systems do not track and cannot avoid occupants, other than by simply turning off the UV-C light source, UV-C light is not visible and does not provoke instinctive, defensive squint or iris responses, and UVGI operates at hazardously high UV-C light intensity levels in order to disinfect spaces quickly and reach surfaces out of the line of site to the UV-C source by reflection, Thus, conventional UVGI systems are unsafe and impractical for continuous disinfection of occupied spaces.

Thus, persistent and highly contagious pathogens cannot be adequately controlled today due to the lack of systems to frequently or continuously disinfect occupied spaces that are safe, broadly effective, and reliable. The apparatus and/or methods disclosed herein seeks to fulfill these requirements as a system for the safe, broadly effective, and frequent disinfection of occupied spaces.

BRIEF DESCRIPTION OF PREFERRED EMBODIMENTS

This disclosure describes embodiments of selected-area ultraviolet disinfection (SUD) systems, intended to enable increased frequency of UVGI treatment of spaces by improving the convenience, cost, safety, and/or efficacy of UVGI versus the prior art. The core utility of the SUD system is to frequently and safely disinfect spaces where occupants are conducting their normal activities, enabled by a system constructed with a disinfecting light source that can direct and irradiate only selected areas (and corresponding volumes) that sensing and control components have determined are safe to disinfect, i.e. are not currently occupied.

In an example embodiment, an apparatus includes controllable light sources configured to irradiate disinfecting light into selected areas of a space. Sensing sub-systems detect the presence of occupants in the space. A control sub-system is configured to receive occupant location information from the sensing sub-systems and controls which selected areas of the space are irradiated by at least one of the disinfecting controllable light sources.

The light sources may be one or more mercury lamps or one or more Light Emitting Diodes (LEDs). The light sources may emit in any or all of a UV-C band (100-280 nm), UV-B band (280-315 nm), UV-A band (315-400 nm), violet band (400-450 nm), or primarily at 254 nm. A field angle of the light sources may be greater than 40° and less than 180°; greater than 4° and less than 40°, or greater than 7° and less than 20°. In some implementations, the light sources also emit in a visible range.

Each of the controllable light sources may have a corresponding truncated cone reflector, first-surface reflector, second-surface reflector, solid optic and reflector separated by an air-gap, total-internal reflection optic, refractive lens, or collimator. A high-pass filter may be used to block UV-B, UV-A and/or visible light emitted from the light sources.

A direction of the light sources may be controlled by mounting them on a motorized stage which can move the light sources around both a tilt axis and a pan axis.

In another embodiment, the light sources have a corresponding set of collimators, with the light sources each positioned at approximately a focal plane of a corresponding one of the collimators. An adjustment mechanism may move the array of collimators relative to the array of light emitters in directions parallel to the focal plane in response to instructions from the control sub-system, such that the output light beam from the light source illuminates a selected area.

In some embodiments, an array of collimators and an array of light sources may be arranged such that each emitter in the array is located at a different relative position with respect to the optical axis of a corresponding one of the collimators, such that the output light beam from a given collimator is enabled to point in a different direction than a direction pointed to by other collimators.

In still other arrangements, the light sources may each include a set of two or more individually-addressable light emitters, and the control subsystem may energize a selected one of the set of light emitters and not energize other ones of the set of light emitters, to thereby further control a shape and direction of light emitted by each collimator.

The sensing sub-system may be configured to detect location, size, or velocity of objects in the space. In particular arrangements, the sensing sub-system may include passive infrared (PIR) sensors, thermal sensors, a thermal camera, a visible light camera, a dot projector, radar, sonar, lidar, tag, beacon, Bluetooth, active radio-frequency identification (RFID), passive RFID, door switch, microphone, photocell, or light detector devices. The sensing sub-system may also include other types of sensors that do not rely on imaging such as a tag, beacon, Bluetooth, active or passive radio-frequency identification (RFID), door switches, microphones, photocells.

Some embodiments may include a sensing sub-system that has an ultraviolet (UV) light detector. In that case, a control sub-system may analyze the output from the UV light detector and compare it against a modulation frequency and/or a phase of at least one of the light sources. The enables determining which light sources contribute to reflected and/or scattered ultraviolet light.

The sensing sub-system may provide further information on one or more occupants including their location within the space, their size, and/or their velocity.

The control sub-systems may determine which selected area within the space can be safely irradiated, and/or at which given time, and accordingly then controls one or more of the controllable light sources to irradiate the selected areas. It may irradiate the selected areas according to a schedule, or after terminal cleaning, or after high contamination risk procedures such as intubation or patient transfer, that include high-risks areas more frequently, after equipment use, according to information received from building control systems such as occupancy, climate measurement, heating ventilation air-conditioning (HVAC), and/or building lighting systems.

The control sub-system may activate the light sources to disinfect selected areas of the space according to detected behaviors of one or more occupants such as only when no occupants are detected, or by avoiding irradiation of areas where occupant(s) have been substantially stationary for an extended period of time, or by avoiding direct irradiation of areas having one or more moving occupants, or in response to detecting coughing, sneezing, seizure, choking, or shortness of breath. Activation of the light sources may also depend on detecting movement of one or more occupants may be tracked to determine if one or more specified procedures are followed, including one or more of occupants disinfecting or clean their hands.

The sensing sub-system may include a thermal sensor with an angular field of view aligned to the angular irradiation area accessible by the light source(s). The field of view of the thermal sensor may be greater than, or at least the same as the area covered by the light source(s). In that embodiment, the control sub-systems may interrupt irradiation when a heat source consistent with a living occupant is detected by the thermal sensor.

The sensing sub-systems may operate to scan the area in a regular raster pattern, a pattern of expanding or contracting circles or polygons, other regular pattern, or based on manual input by a user.

Methods can also be implemented to achieve the same result of any or all of the above. For example, a method for disinfecting a space may include sensing whether one or more occupants are in the space and determining their detected locations; and then accordingly controlling one or more disinfecting light sources to selectively irradiate only one or more areas within the space according to the detected locations.

Such methods may include a sensing step that provides further information on the one or more occupants including their size, and/or their velocity. In some embodiments, the method can further determine which selected area within the space can be safely irradiated, and/or at which given time. For example, irradiate the selected areas may be irradiated according to a schedule, or after terminal cleaning, or after high contamination risk procedures such as intubation or patient transfer, that include high-risks areas more frequently, after equipment use, according to information received from building control systems such as occupancy, climate measurement, heating ventilation air-conditioning (HVAC), and/or building lighting systems. In still other arrangements, selected areas of the space may be irradiated according to detected behaviors of one or more occupants, including by irradiating only when no occupants are detected, or by avoiding irradiation of areas where occupant(s) have been substantially stationary for an extended period of time, or by avoiding direct irradiation of areas having one or more moving occupants, or in response to detecting coughing, sneezing, seizure, choking, or shortness of breath.

BRIEF DESCRIPTION OF DRAWINGS

These and other objects, features and advantages will become apparent from the following detailed description of illustrative embodiments, which is to be read in connection with the accompanying drawings. The various features of the drawings are not to scale as the illustrations are for clarity in facilitating one skilled in the art in understanding the detailed description.

FIG. 6A—Cross-section view of Light Field SUD light source with second-surface reflector collimators and light emitters configured to project individual beams with different pointing angles.

DETAILED DESCRIPTION OF PREFERRED EMBODIMENTS

1. System

Figure 1A:
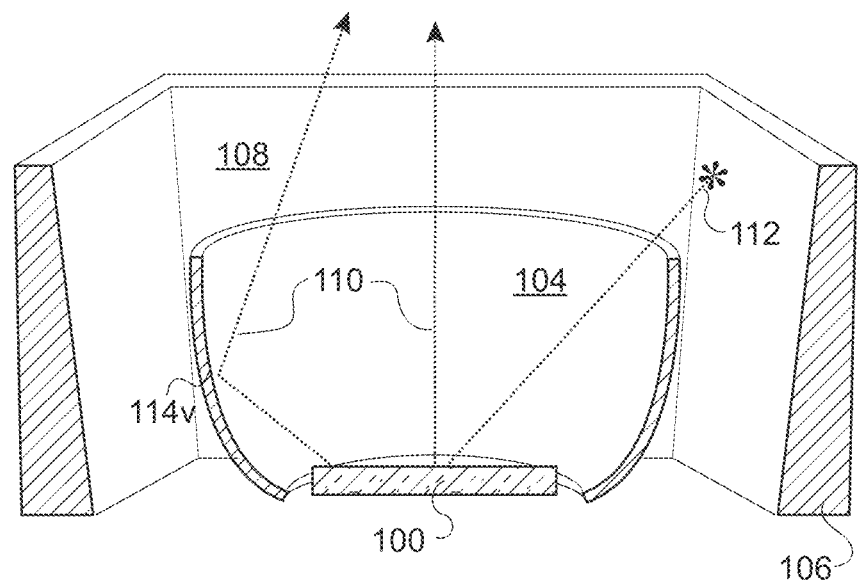
FIG. 1A—Cutaway perspective view of a hollow reflector embodiment of a SUD collimator and a LED light emitter.

The disclosed SUD comprises an interconnected system of:
one or more disinfecting light sources constructed to be able to irradiate selected areas of a space (SUD light source),
one or more sensing sub-systems with sensors capable detecting the location of occupants in a space (SUD sensing sub-system), and
one or more control sub-systems capable of using information from one or more sensing sub-systems to control which areas of the space are irradiated by the disinfecting light sources (SUD control sub-system).

The SUD systems may disinfect normally occupied spaces, because the SUD control sub-systems can direct light at selected areas for disinfection while avoiding occupants. These SUD systems may be configured to operate frequently, periodically, or continuously, depending on the capability level of the tracking and control systems and the requirements of the application.

The SUD systems may directly disinfect selected areas that have a clear line of sight to the SUD light sources and the air in between, plus indirectly disinfect areas that receive light reflected from the selected areas. The SUD systems may be installed in fixed locations, such as in the ceilings or on the walls of a space, or incorporated into manual or automated mobile systems, such as robots, drones, etc.

2. Safety

The SUD systems described herein are novel over the prior art in that the controllable light sources, sensing sub-system, and control sub-system operate together for the safe disinfection of occupied spaces.

For the preferred emission in the UV-C and short UV-B bands, eye damage is the primary health hazard, with photokeratitis and photoconjunctivitis occurring for excessive exposures. Despite being largely absorbed in the outer skin layer, skin exposure results in acute erythema and deep exfoliation and is presumed to be carcinogenic due to measurable cyclobutane pyrimidine dimer formation and gene modification. The ACGIH threshold limit value (TLV) for UV-C (254 nm) is 6 $mJ/cm^2$ over 8 hours in a 40 hour work week.

Conventional UVGI is not suitable for disinfection of occupied spaces. UVGI systems operate at high fluence levels for rapid turnover of evacuated spaces, so unprotected occupants reach TLV in seconds or less and accidental short exposures have resulted in documented injuries. UVGI systems would be safer if they operated at lower power, but the required UV-C fluence needed to disinfect surfaces is much higher than the TLV and thus omnidirectional or flood light UVGI systems are not safe to operate in occupied spaces at any power level.

The SUD systems described herein are constructed to avoid human occupants and thus have the potential for frequent or continuous disinfection of occupied spaces. These SUD systems do not necessarily require a space to be evacuated and hence do not have the same cycle time pressure as conventional UVGI, so they may be constructed to operate at lower light intensity levels that are safer in case of accidental exposure.

When an SUD system disinfects a space, excess glare from the SUD light source and reflection off surfaces contribute to a primarily diffuse background exposure of ultraviolet light. Glare from SUD light sources is therefore preferably tightly controlled with measures that may include tight beam collimation, full-cutoff baffles, and/or other glare reduction features. Reflections will typically vary in each room, since many materials strongly absorb ultraviolet light, but some metals and plastics (especially PTFE) have substantial ultraviolet reflectivity. Many surfaces will have primarily diffuse reflectivity and contribute to a background exposure in the space, which a SUD system could detect and/or map with ultraviolet light sensors. Specular reflections would have some probability of impinging on occupants, which a SUD system could map via sensors and mitigate with its control sub-system.

SUD light sources may also comprise visible light emitters that add visible light to the beam to provide a visible indication of beam position and to provoke instinctive guarding responses, e.g. squinting, iris contraction, etc, against accidental exposure to reflections or the direct beam.

3. Selected-Area Light Source

Light sources used with the SUD system are preferably designed to irradiate selected areas of a space that are determined by the control sub-system, where selected area is taken to refer to an irradiated area that is smaller than the full area that can be irradiated by the SUD system.

The SUD systems may also operate as directional light sources for direct or directional lighting of selected specific areas to illuminate, as defined by the Illumination Engineering Society (IES) in their publication IES RP-16-10 entitled "Nomenclature and Definitions for Illuminating Engineering". More specifically, direct lighting is defined in that document as "Lighting involving luminaires that distribute 90 to 100 percent of the emitted light in the general direction of the surface to be illuminated" and directional lighting is similarly defined as "Lighting provided on the work-plane or on an object that is predominantly from a preferred direction".

Accordingly, the light sources described herein are said to be controllable, in that they emit a beam that can be adjusted for properties comprising direction, intensity, size, shape, and color.

In some embodiments, SUD light sources comprise one or more ultraviolet light-emitters and one or more optical elements to produce directional ultraviolet light.

Light Emitters

A SUD light source comprises one or more SUD light emitters that emit disinfecting light. In some embodiments, SUD light emitters may be low-pressure mercury lamps fabricated to emit predominantly ultraviolet light. In some embodiments, SUD light emitters are ultraviolet light-emitting diodes (LEDs). SUD light sources may also comprise other ultraviolet emitters, for example krypton-chlorine excimer lamps and xenon arc lamps.

SUD light emitters, in some embodiments, emit light primarily in the UV-C band (100-280 nm), the UV-B band (280-315 nm), or both, because of the broad efficacy of these wavelengths against pathogens. In some embodiments, SUD light emitters emit light in the UV-A (315-400 nm) or violet (400-450 nm) bands to target specific pathogens sensitive to those bands.

UVGI systems are typically constructed with light sources operating primarily at 254 nm, historically because that is a strong UV-C emission line of low-pressure mercury vapor lamps and more recently because so much historical evidence of pathogen disinfection efficacy is based on 254 nm investigations. SUD light emitters, in some embodiments, may therefore emit light primarily with a wavelength of 254 nm; however in some embodiments, SUD light emitters may emit light primarily with a wavelength ranging between 180 nm and 315 nm; and in some embodiments, SUD light sources may emit light primarily with a wavelength ranging between 254 nm and 300 nm.

Most ultraviolet light emitters have some visible violet and/or blue portion of their light emission, which is undesirable in some applications. Visible light activates DNA repair mechanisms in some pathogens, in part counteracting the disinfection utility of ultraviolet light. Visible blue light also triggers a melanopic response that can have negative physiological effects, including disrupting circadian rhythms. Thus, in some embodiments, SUD light sources may comprise a high-pass filter that provides for emission of the desired ultraviolet light while blocking UV-B, UV-A, and/or visible light.

In some embodiments, a SUD light source may comprise a plurality of the disinfecting light emitters disclosed in the above embodiments.

SUD light sources, in some embodiments, may also comprise visible light (380-760 nm) emitters to provide a visible indicator of the areas being irradiated by the nominally invisible ultraviolet light. Since the materials used for ultraviolet light typically also function in visible light, in some embodiments the visible light emitters are placed near the ultraviolet light emitters under a common set of optics so that the beams of visible and ultraviolet light emitted by the SUD system are substantially overlapping.

In some embodiments, SUD light emitters may be powered to emit light with constant output. In other embodiments, SUD light emitters may be powered to modulate light output in order to reduce the average light output level, in order to integrate with the actuation system of the light source or with the control sub-system, and/or because modulated light is more efficacious against certain pathogens.

Collimator Optics

SUD light sources, in some embodiments, may comprise optical elements in the form of collimator optics to direct light from SUD light emitters to selected areas. Several types of collimators are disclosed for SUD systems suitable to directing ultraviolet light to selected areas with acceptable performance.

Hollow reflector optics are one option for ultraviolet collimators used for SUD, where a solid component comprising an ultraviolet-reflective material is formed as a collimator and where light is reflected at an outside ultraviolet-reflective surface of the collimator. Hollow reflector collimators have an advantage that the ultraviolet light does not travel through a solid or liquid medium that may absorb, scatter, or otherwise attenuate the light. Second-surface reflector (SSR) optics are another option for ultraviolet collimators used for SUD, where a solid component comprising a substantially ultraviolet-transparent material is coated with an ultraviolet-reflective material to form a collimator where light is primarily transmitted through the substantially ultraviolet-transparent material and is reflected at an inside reflective interface of the ultraviolet-transparent and ultraviolet-reflective materials.

FIG. 1A shows an embodiment of a hollow reflector collimator with additional components. An LED light emitter 100 is surrounded by a hollow reflector collimator comprising a truncated cone reflector 114 with a reflective coating 104 on its interior surface. The truncated cone reflector 114 may have a curved shape, as shown, or another shape such as straight, faceted, etc. Light rays 110 from the light emitter 100 are substantially collimated by the hollow reflector collimator. Surrounding the hollow reflector collimator is a glare-reducing baffle structure 106 with a light-absorbing surface 108. Light rays 112 that escape the hollow reflector collimator at undesirable angles strike the surface 108 and are absorbed.

Figure 1B:
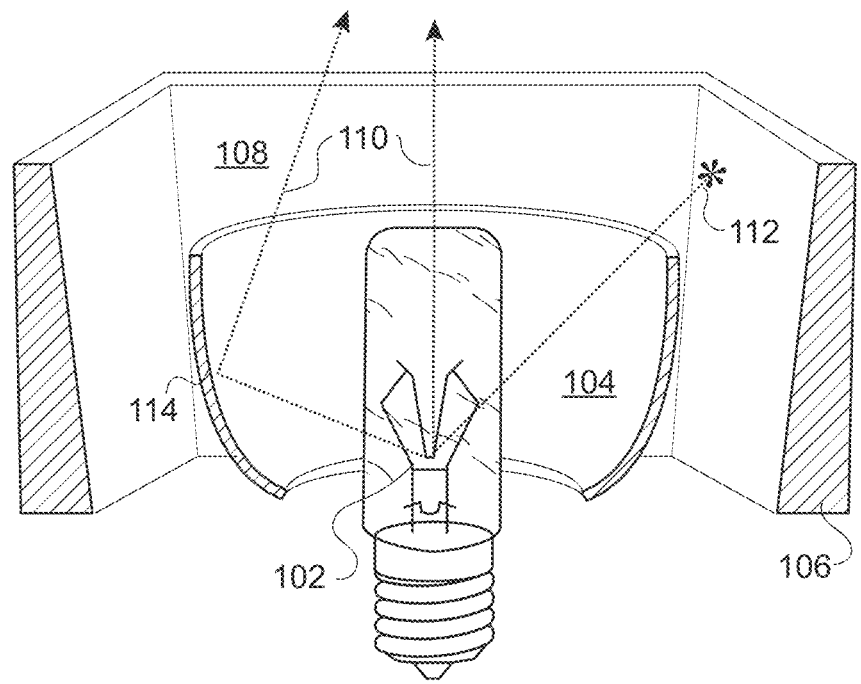
FIG. 1B—Cutaway perspective view of a hollow reflector embodiment of a SUD collimator and a low-pressure mercury vapor bulb light emitter.

FIG. 1B shows a similar embodiment of a hollow reflector collimator with a low-pressure mercury bulb light emitter 102 surrounded by a hollow reflector collimator and baffle 106.

Figure 2A:
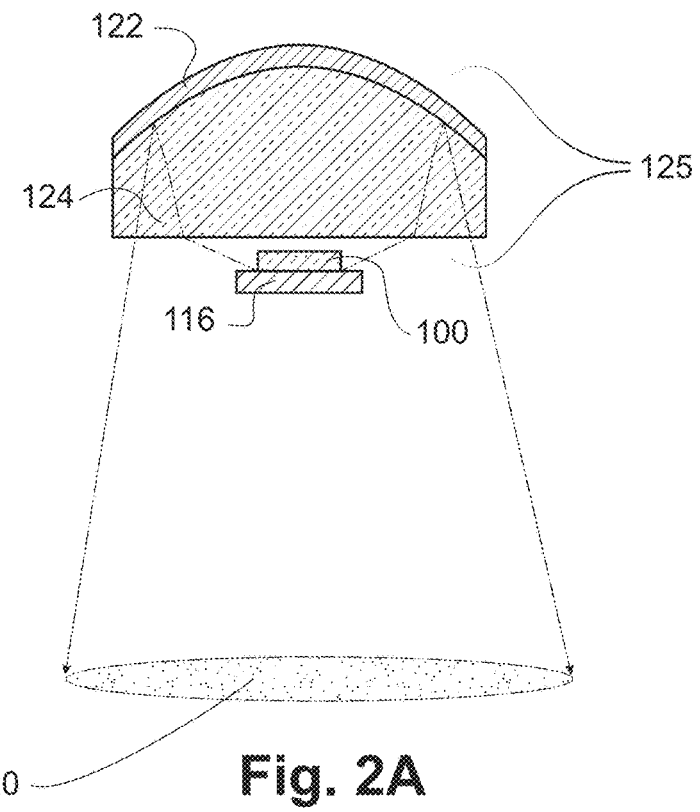
FIG. 2A—Cross-section view of an SSR collimator, with reflective coating disposed on optic.

FIG. 2A shows an embodiment of an SSR collimator 125 with additional components. The SSR collimator is formed as a transparent solid optic 124 with a planar side and a convex side and with a reflective material 122 disposed on the convex side. The light emitter 100 is mounted on a substrate 116 and held in proximity to the planar side of the optic 124. Light emitted by the light emitter 100 enters the optic 124, is reflected by the reflective material 122, and then exits the planar side where it forms a substantially collimated beam 120.

Figure 2B:
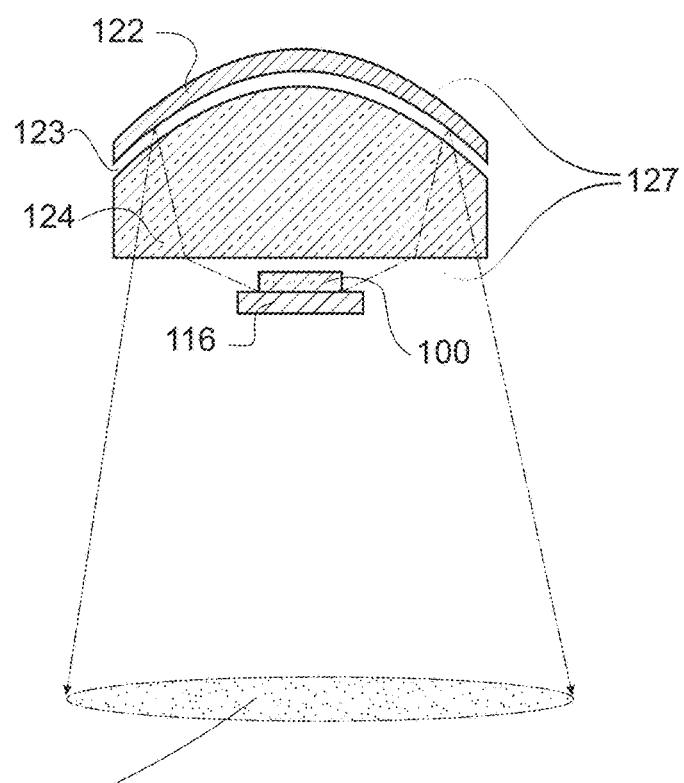
FIG. 2B—Cross-section view of an FSR collimator, with a solid optic separated from the FSR collimator by an air-gap.

FIG. 2B shows an embodiment of a Front Surface Reflector (FSR) collimator 127 with an airgap and additional components. The FSR collimator 127 is formed as a transparent solid optic 124 with a planar side and a convex side and with a reflective material 122 separated from the convex side of the solid optic 124 by a narrow air gap 123. The light emitter 100 is mounted on a substrate 116 and held in proximity to the planar side of the optic 124. Light emitted by the light emitter 100 enters the optic 124, is reflected by the reflective material 122, and then exits the planar side where it forms a substantially collimated beam 120.

Refractive lenses are another option for ultraviolet collimators used for SUD, where a solid component comprising an ultraviolet-transparent material with at least one curved surface is formed as a collimator, what is commonly thought of as a lens. One or more such lenses may be used in tandem to collimate the light. Total internal reflection (TIR) collimators are another option for ultraviolet collimators used for SUD, where a solid component comprising a transparent material is formed so that at least one reflection occurs inside the component due to total internal reflection, i.e. the phenomenon where light impinging at an interface of mediums with dissimilar refractive index at an angle above the critical angle for total reflection at the interface is reflected.

Figure 3A:
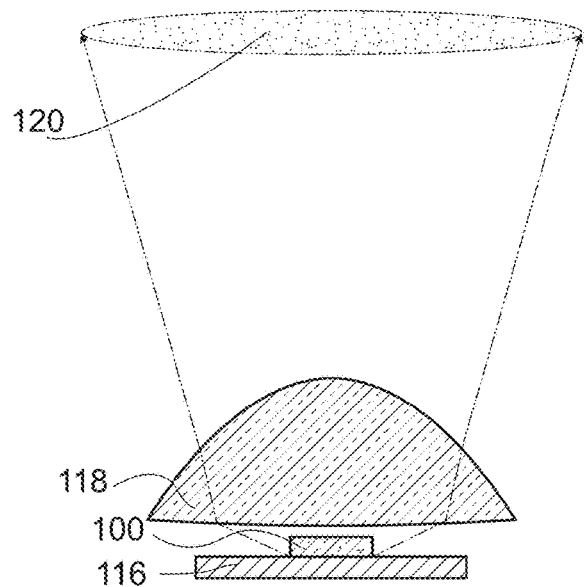
FIG. 3A—Cross-section view of a single refractive lens embodiment of a SUD collimator and a LED light emitter.
Figure 3B:
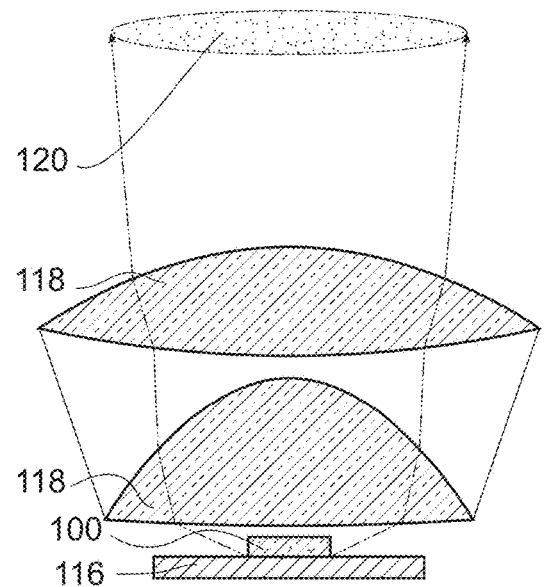
FIG. 3B—Cross-section view of a double refractive lens embodiment of a SUD collimator and a LED light emitter.
Figure 3C:
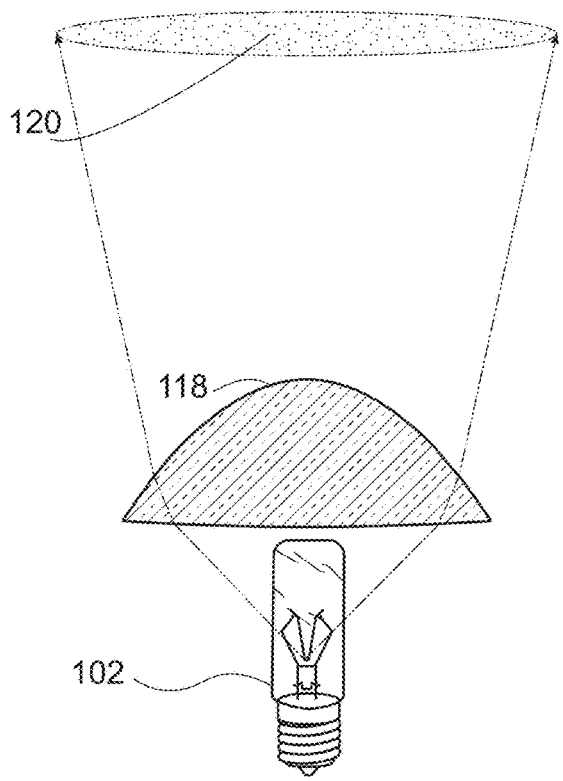
FIG. 3C—Cross-section view of single refractive lens embodiment of a SUD collimator and a low-pressure mercury vapor bulb light emitter.
Figure 3D:
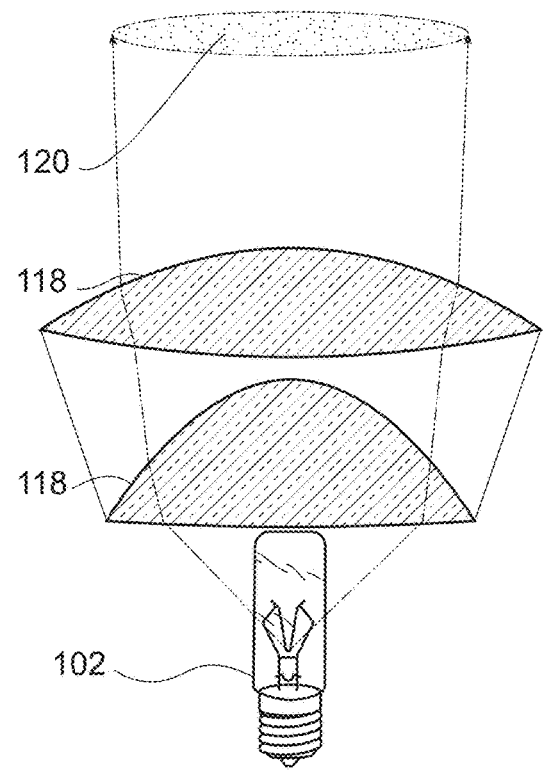
FIG. 3D—Cross-section view of double refractive lens embodiment of a SUD collimator and a low-pressure mercury vapor bulb light emitter.

FIG. 3A shows an embodiment of a refractive collimator comprising a single lens 118. A LED light emitter 100 is mounted on a substrate 116. The light from the light emitter 100 is substantially collimated by the refractive lens 118, forming a focused beam 120. FIG. 3B shows a refractive collimator comprising two refractive lenses 118 to form a focused beam 120. FIG. 3C shows a refractive collimator comprising a single lens 118 used with a low-pressure mercury vapor bulb light emitter 102. FIG. 3D shows a double refractive lens collimator 118 used with a mercury vapor bulb light emitter 102.

For any collimator using a reflective material (e.g. hollow reflector, FSR, and SSR types), the reflective material should provide a primarily specular reflection of ultraviolet light and may be composed of aluminum, a multilayer of thin dielectric films designed to reflect ultraviolet light, or other materials with substantial reflectivity for ultraviolet light. For any collimator in which the ultraviolet light transmits through a bulk material (e.g. FSR, SSR, TIR, and refractive lens types), the bulk material must be substantially transparent to ultraviolet wavelengths of interest and may be composed of materials comprising glass formulated to have high transparency to ultraviolet light, silicone, fused quartz, crystalline quartz, sapphire, aluminum nitride, calcium fluoride, and magnesium fluoride.

These examples of collimator embodiments and preferred materials are not exhaustive and useful variations and combinations of the disclosed optical approaches will be evident to those of ordinary skill in the art.

Selected-Area Size, Beam Dimensions, and Fluence Rates

Directional light sources are commonly characterized by the size of their beam, as measured by their angular full-width at half of maximum intensity ("FWHM") or full-width at 10% of maximum intensity ("field angle"), the latter commonly considered to be the edge of a beam of light. As a directional light source, SUD light sources can be similarly characterized by the beam field angle corresponding to the smallest selected-area they can irradiate or not irradiate, i.e. the resolution with which a SUD light source can selectively irradiate areas of a room. In some embodiments, the field angle of a SUD light source may be smaller than the field angle of the ultraviolet light emitter operated without optics. In other embodiments, the field angle may be greater than or equal to 40° and less than 180°. In other embodiments, the field angle may be greater than 4° and less than 40°. In other some embodiments, the field angle may be greater than 7° and less than 20°.

SUD systems will often be installed in or on the ceiling to irradiate areas in a downward direction, so a selected-area for irradiation can be associated with a FWHM or field angle for a given ceiling height and SUDS position. In some embodiments, the field angle of a SUD light source may correspond to a selected area of half or less of the room it is operating in; for a 100 square foot room with an 8 foot height ceiling, half the room area may correspond to a field angle of 53°. In other embodiments, the field angle of a SUD light source corresponds to a selected area of a person with arms outstretched; for an average male arm span of 5 feet 9 inches and an 8 foot height ceiling, this may correspond to a field angle of 40°.

SUD light sources preferably have very low glare and scatter outside the selected area they are irradiating. Optical systems that provide for inherently low glare and a high standard for the smoothness of optical surfaces are preferred. In some embodiments, SUD light sources comprise baffles, shields, and/or related components that block glare and scattered light.

SUD systems may be constructed with a variety of light emitters, as disclosed previously. If constructed to operate at high ultraviolet fluence rates onto selected areas, SUD systems can disinfect spaces more rapidly, more frequently and/or achieving a greater degree of disinfection. If constructed to operate at low ultraviolet fluence rates into selected areas, SUD systems require less power and less or smaller light sources to operate and reach TLV slowly if an occupant is accidentally irradiated directly by the SUD system.

In some embodiments, the SUD system may operate with a fluence rate greater than 1 microwatt/cm$^2$. In some embodiments, the SUD system may operate with a fluence rate greater than 1 microwatt/cm$^2$ and less than 1 watt/cm$^2$. In some embodiments, the SUD system may operate with a fluence rate greater than 5 microwatt/cm$^2$ and less than 10,000 microwatts/cm$^2$.

In some embodiments, the SUD system may operate with a fluence rate greater than 10 microwatt/cm$^2$ and less than 5,000 microwatts/cm$^2$. In some embodiments, the SUD system may operate with a fluence rate greater than 20 microwatt/cm$^2$ and less than 1,000 microwatts/cm$^2$.

While the preceding discussion describes a selected area as a target for irradiation, the beam emitted by an SUD light source passes through and disinfects the volume of air between the light source and selected area, where the shape of the volume of air can be described also by the beam field angle, the size of the light source, and distance to the selected-area.

These examples of directional beam field angles, irradiated area sizes, and fluence rates are not exhaustive and the shape and size of asymmetric beams may be described in a different manner, as in some embodiments of SUD, but the variations in how to describe the useful sizes of selected-areas for irradiation and how to apply them to more complex irradiation shapes will be evident to those of ordinary skill in the art.

Example Light Source Embodiments

An example SUD light source comprises one or more SUD light emitters, SUD collimators to direct light from the SUD light emitters to selected-areas, and some arrangement enabling adjustment of the direction of emitted beams to selected areas. The latter may involve mechanical elements that adjust the position of the SUD collimators and/or light emitters. A number of example embodiments of SUD light sources are provided below.

In a first light source embodiment, a SUD light source is an adjustable, motorized-gimbal, directional light fixture comprising one or more collimators, one or more ultraviolet light emitters, and one or more gimbals actuated by a motor, where the light emitters and collimators are assembled with a fixed relationship to project a directional beam of ultraviolet light and the assembly is mounted on the one or more gimbals so that the direction of the beam is controlled by the angular orientation of the gimbals. The SUD control subsystem directs the SUD light source to move its beam to desired selected areas by actuating the motorized gimbals to pan and tilt the light emitter and collimator optics assembly until they physically point at the selected area.

Figure 4A:
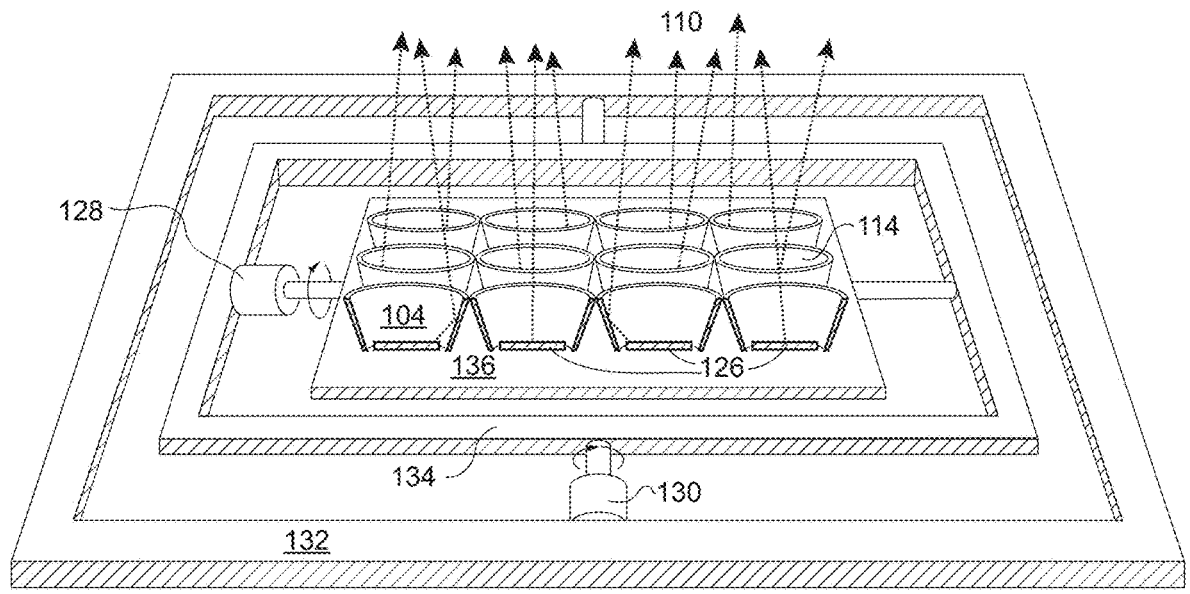
FIG. 4A—Perspective view of SUD light source with hollow reflector collimators (shown in cutaway cross-section in the front row) with a nested two-axis gimbal mounting.

FIG. 4A shows an example of the first light source embodiment. The SUD light source comprises an array of truncated cone reflectors 114 with first surface mirror coating 104, with each reflector 114 surrounding a light emitter 126. The arrays of reflectors 114 and emitters 126 are mounted on a platform 136. The platform 136 is mounted within nested frames: it is attached to moving frame 134 via a rotational axis that may be adjusted via motor 128. Moving frame 134 is attached to stationary frame 132 via a second, rotational axis that may be adjusted via motor 130. By adjusting the rotational position of the two motors, the pointing of the output light 110 may be adjusted in two axes.

Figure 4B:
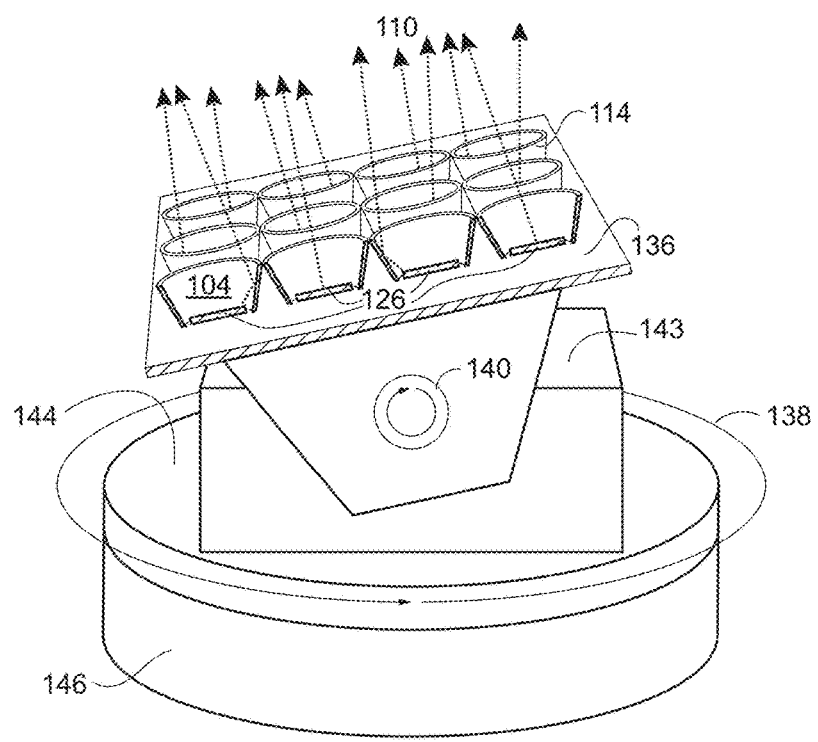
FIG. 4B—Perspective view of SUD light source with hollow reflector collimators (shown in cutaway cross-section in the front row) with a pan-tilt stage mounting.

FIG. 4B shows another example of the first light source embodiment. Again, the SUD light source uses an array of truncated cone reflectors 114 with first surface mirror coating 104, with each reflector cone surrounding a light emitter 126. The arrays of reflectors 114 and emitters 126 are mounted on a platform 136. In this embodiment, the platform 136 is mounted on a motorized pan/tilt stage composed of framing elements 143 and 144, and stationary base 146. The framing elements and embedded motors (not shown) allow rotation 140 around a tilt axis and rotation 138 around a pan axis 140. By adjusting the rotational position of the two motors, the pointing of the output light 110 may be adjusted in two axes.

In a second light source embodiment, a SUD light source is an adjustable, motor-actuated, directional light fixture comprising an array of collimators, a corresponding array of ultraviolet light emitters positioned at approximately a focal plane of the array of collimators, and an actuation system that can move the array of collimators relative to the array of light emitters in directions parallel to the focal plane. When an ultraviolet light emitter is positioned at the optical axis of its corresponding collimator, the emitted beam is transmitted parallel to the optical axis; when an ultraviolet light emitter is moved away from the optical axis of its corresponding collimator, the emitted beam is tilted away from the direction of the movement. The resultant SUD light source is adjustable in beam direction without requiring the light emitter, collimator, and/or light source to be tilted or rotated; indeed, the moving parts can be fully self-contained in the light source with the advantages that the light source is compact, reliable, and remains stationary as it is adjusted. The SUD control sub-system directs the SUD light source to move its beam to desired selected areas by moving the collimators optics array relative to the ultraviolet light emitter array until the beam points at the selected area. This second light source embodiment is described in greater detail for visible light emitters in U.S. Pat. No. 10,563,844 and is referred to commercially as LightShift®. (LightShift is a registered trademark of Glint Photonics, Inc. of Burlingame, CA).

Figure 5A:
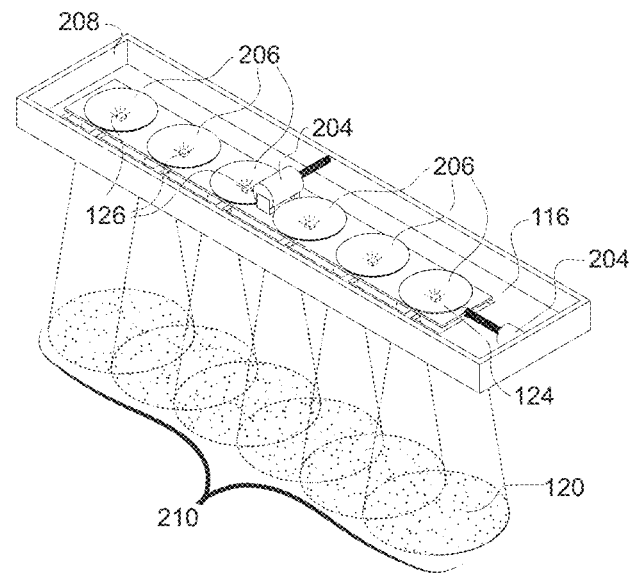
FIG. 5A—Perspective view of SUD light source with second-surface reflector collimators centered over light emitters.
Figure 5B:
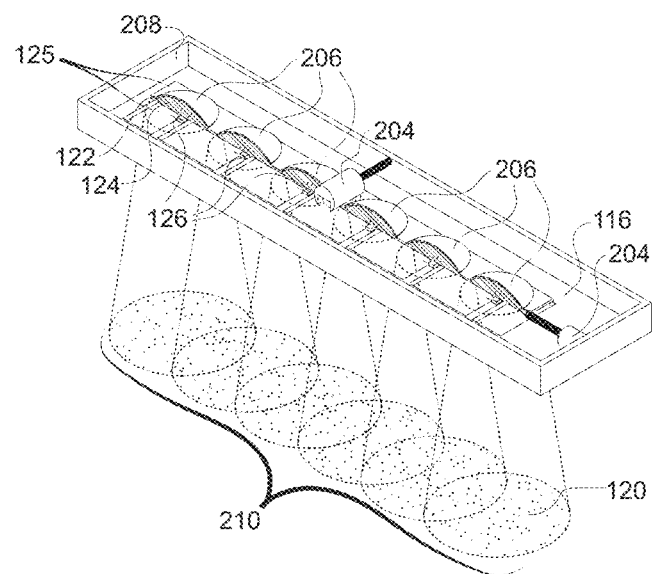
FIG. 5B—Perspective view of SUD light source with second-surface reflector collimators centered over light emitters, and with collimators shown in cutaway cross-section.

FIG. 5A shows an example SUD light source of the second embodiment. The example features six SSR collimators 125 in a linear array 206, disposed within a housing 208, and matched to ultraviolet light emitters 126 in a corresponding linear array. Actuators 204 move the collimator array 206 relative to the light emitter array, controlling the direction of emission for the collimated beams 120, which combine together in the far-field into composite output beam 210. In FIG. 5A, the light emitters 126 are located at the optical axis of the corresponding collimators 125, resulting in collimated output beams 120 that are pointed parallel to the optical axis of the collimators 125. FIGS. 5B through 5F show movement 214 in the angle of output beams 120 and composite output beam 210 as a result of movement 212 of the collimator array 206 relative to the corresponding light emitters 126. In FIGS. 5B through 5F the collimators 125 are shown in cutaway cross-section for clarity. In FIG. 5B, the light emitters 126 are located at the optical axis of the corresponding collimators 125 (as also in FIG. 5A), resulting in collimated output beams 120 and composite output beam 210 that are pointed parallel to the optical axis of the collimators 125.

Figure 5C:
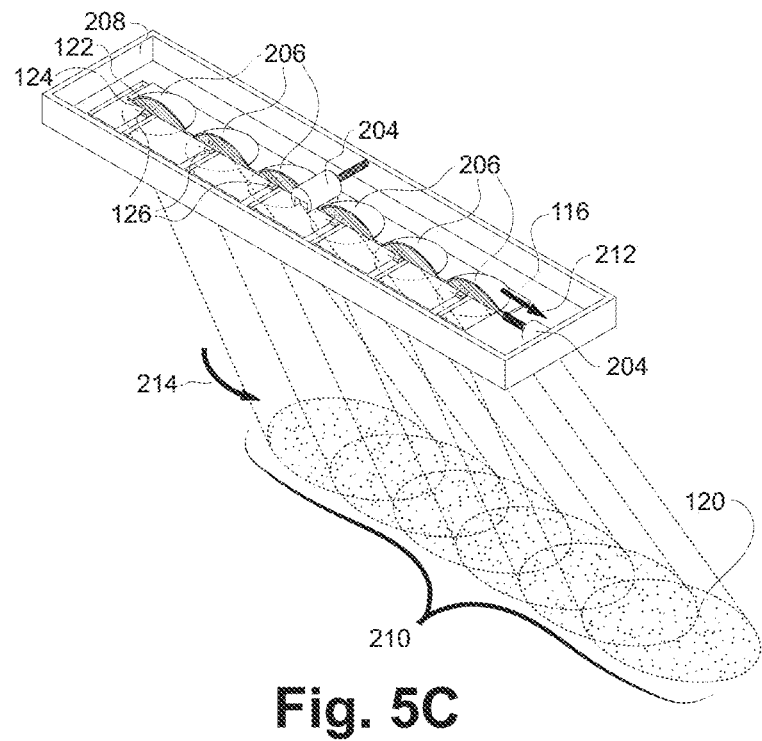
FIGS. 5C through 5F—Perspective view of SUD light source with second-surface reflector collimators shifted in various directions with respect to light emitters, and with collimators shown in cutaway cross-section.

Compared to FIG. 5B, in FIG. 5C the collimators 125 have been shifted toward the lower right corner of the Fig., moving parallel to the direction of the linear array, and the resulting collimated output beams 120 are similarly shifted toward the lower right corner of the figure, moving parallel to the direction of the linear array.

Figure 5D:
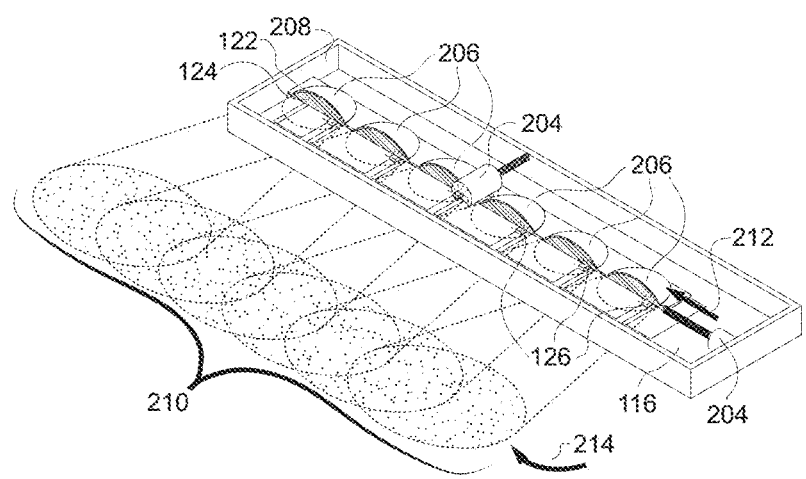

Compared to FIG. 5B, in FIG. 5D the collimators 125 have been shifted toward the upper left corner of the figure, moving parallel to the direction of the linear array, and the resulting collimated output beams 120 are similarly shifted toward the upper left corner of the figure, moving parallel to the direction of the linear array.

Figure 5E:
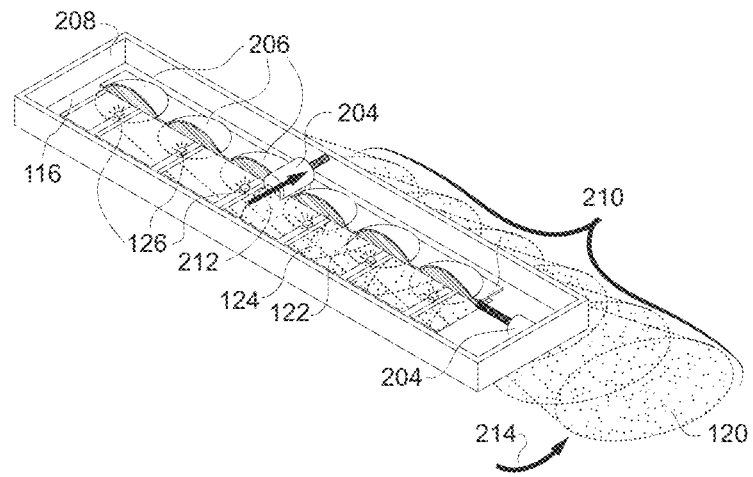

Compared to FIG. 5B, in FIG. 5E the collimators 125 have been shifted toward the upper right corner of the figure., moving perpendicular to the direction of the linear array, and the resulting collimated output beams 120 are similarly shifted toward the upper right corner of the figure, moving perpendicular to the direction of the linear array.

Figure 5F:
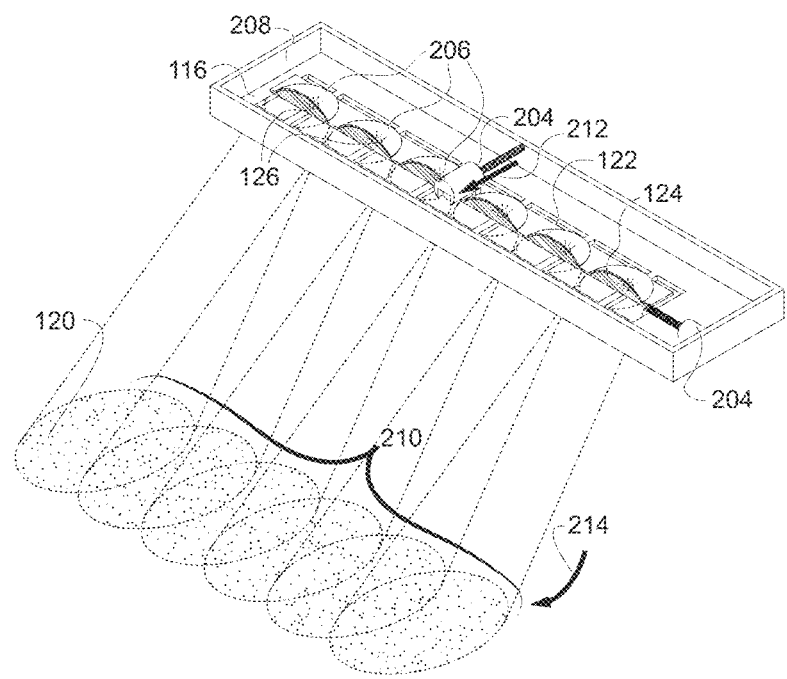

Compared to FIG. 5B, in FIG. 5F the collimators 125 have been shifted toward the lower left corner of the figure, moving perpendicular to the direction of the linear array, and the resulting collimated output beams 120 are similarly shifted toward the lower left corner of the figure, moving perpendicular to the direction of the linear array.

In a third light source embodiment, a SUD light source is a configurable directional light fixture comprising an array of collimators and an array of ultraviolet light emitters where the relative position of ultraviolet light emitter with respect to the optical axis of collimator varies in the array. When an ultraviolet light emitter is positioned at the optical axis of a collimator, the emitted beam is transmitted parallel to the optical axis; when an ultraviolet light emitter is positioned away from the optical axis of a collimator, the emitted beam is tilted away from the direction of the movement. Varying the relative position of the ultraviolet light emitter to the position of the collimator in the array produces beams that correspondingly vary in direction, and selectively powering a sub-set of the total available ultraviolet light emitters results in an aggregate SUD system beam that irradiates a selected area smaller than the total area that the SUD system can address. Small groups of ultraviolet light emitters can be powered in a pattern that resembles the first and second light source embodiments, i.e. to emulate a beam sweeping across the space in desired selected areas. Alternatively, a substantial number of the ultraviolet light emitters can be powered such that many desired selected areas are irradiated concurrently while not irradiating occupants. This third light source embodiment is described in greater detail for visible light emitters in U.S. Pat. No. 10,563,844 and is referred to commercially as Lightfield.

FIG. 6A shows one example SUD light source of the third embodiment. It comprises a linear array 206 of SSR collimators 125 and a corresponding array of ultraviolet light emitters 100. Note that the ultraviolet light emitters 100 in the array are not all located in a consistent relative position with respect to the optical axis of the corresponding collimators 125. As a result, the output light beam 120 from a given collimator may be pointed in a different direction than the direction pointed to by the other collimators.

Figure 6B:
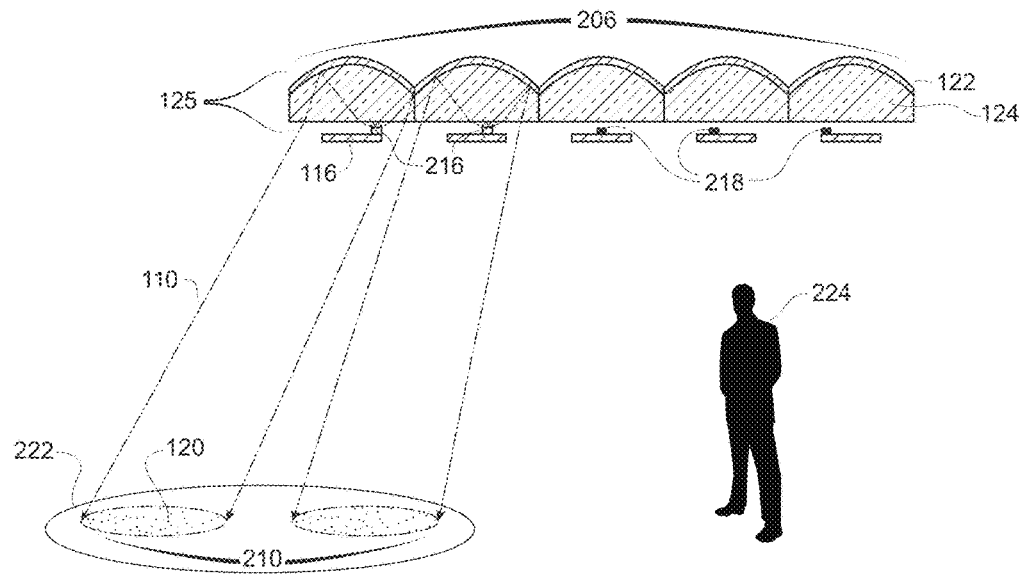
FIG. 6B—Operation of Light Field SUD light source to irradiate a selected area and avoid irradiating an area selected for non-irradiation.
Figure 6C:
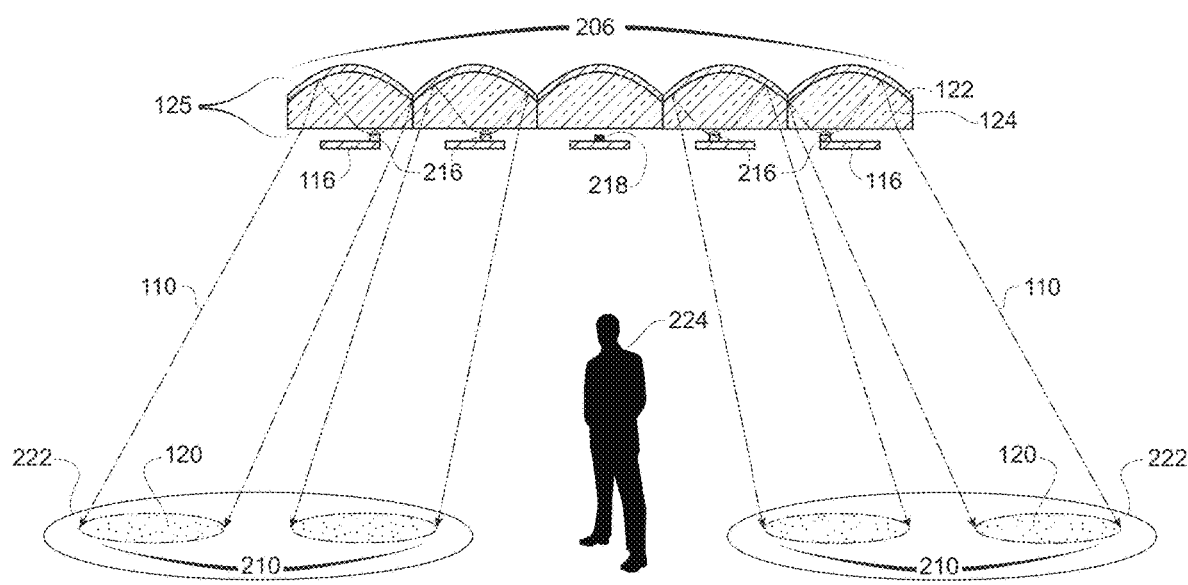
FIG. 6C—Operation of Light Field SUD light source to irradiate multiple selected areas and avoid irradiating an area selected for non-irradiation.

FIGS. 6B and 6C show the SUD light source in operation. In both FIGS. 6B and 6C, the control sub-system (not shown) has only energized some of the ultraviolet light emitters 216, so that the resulting output beams 120 form one or more composite output beams 210 that irradiate identified irradiation targets 222. Other ultraviolet light emitters 218 are not energized, in order to ensure that an area 224 identified for non-irradiation is not irradiated. That area may be occupied by a person, for example.

Figure 7A:
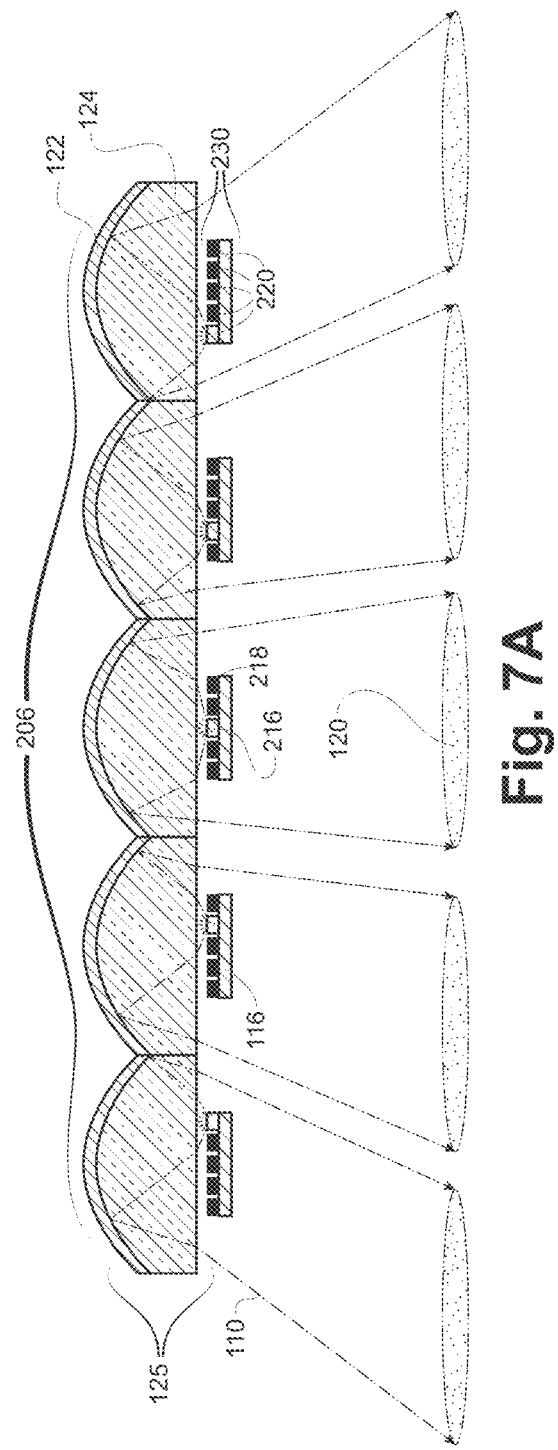
FIG. 7A—Cross-section view of Light Field SUD light source with second-surface reflector collimators and pixelated light emitters.
Figure 7B:
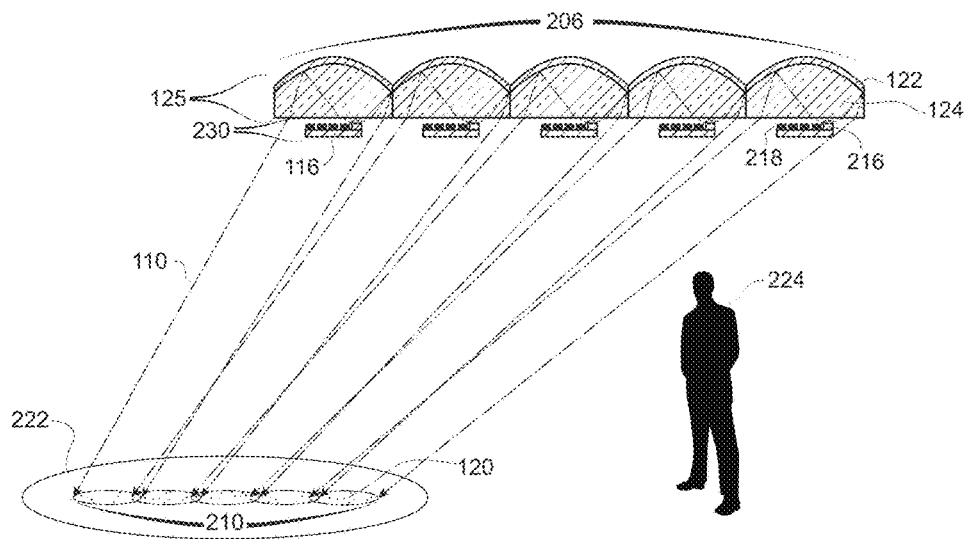
FIG. 7B—Operation of Light Field SUD light source to irradiate a selected area and avoid irradiating an area selected for non-irradiation.
Figure 7C:
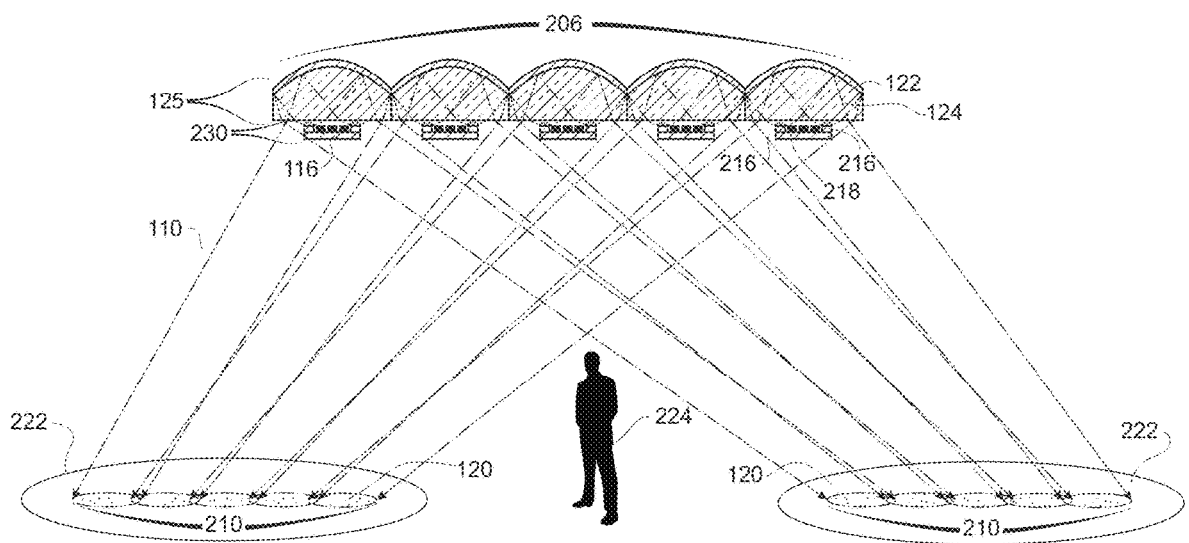
FIG. 7C—Operation of Light Field SUD light source to irradiate multiple selected areas and avoid irradiating an area selected for non-irradiation.

FIG. 7A shows one example SUD light source of the third embodiment. It comprises an array 206 of SSR collimators 125. It further comprises corresponding pixelated ultraviolet light emitters 230, with each pixelated light emitter 230 being comprised of an array of individually-addressable light emitters 220. The control system (not shown) can energize certain individual light emitters 216 and not energize others light emitters 218. This determines the shape and pointing of the output light 110 from each SSR collimator 125. In the example of FIG. 7A, a different single individual light emitter 216 is energized within each pixelated ultraviolet light emitter 230, resulting in a differently pointed collimated beam 120 projected from each collimator 125. In FIG. 7B, the control system has energized a single light emitter in each pixelated ultraviolet light emitter 230, resulting in output beams 120 that are steered to irradiation target 222 and avoid non-irradiation target 224. In FIG. 7C, the control system has energized multiple light emitters in each pixelated ultraviolet light emitter 230, resulting in output beams 120 that are steered to illuminate multiple irradiation targets 222 and avoid non-irradiation target 224.

These embodiments of SUD light sources are examples but are not exhaustive. Within the disclosed embodiments, variations in construction and capabilities are possible, as are combinations of the embodiments, e.g. a light source of the second light source embodiment where the collimators move to provide beam direction adjustment in a first axis and one gimbal is used as in the first light source embodiment to provide beam direction adjustment in a second axis, or a light source of the first light source embodiment with a plurality of ultraviolet light emitters and collimators where the relative position of ultraviolet light emitter with respect to the optical axis of collimator varies and the ultraviolet light emitters can be powered selectively to modify beam size, shape, and/or intensity. Those of ordinary skill in the art will recognize additional useful combinations and variations of the disclosed light source embodiments to construct selected-area light sources.

4. Sensing Sub-System

To safely disinfect an occupied space, SUD systems preferably also locate and avoid irradiating occupants in real-time. SUD sensing sub-systems determine where occupants are within the "addressable" or "selectable" space of the SUD irradiation beam(s).

Specific requirements on the sensing sub-system and details of its construction depend on various factors, including the expected occupancy of a space, the desired frequency of disinfection, and method by which the control sub-system utilizes occupant information. Actively disinfecting around multiple moving occupants requires a high sensing and control capability overall and, in some embodiments, the sensing sub-system may therefore track the location and velocity of individual occupants. In some embodiments, the sensing sub-system may wait for quiet moments with one or two stationary occupants, e.g. a resting patient, at which time the system can operate with simple occupancy sensing.

Sensors

SUD sensing sub-systems incorporate one or more sensing technologies to detect, locate, and/or identify occupants. In some embodiments, passive infrared (PIR) sensors may be used to detect movement. In some embodiments, thermal sensors may be used to detect the presence of warm bodies. In some embodiments, a thermal camera may be used to acquire thermal images. In some embodiments, a visible light camera may be used to acquire visible light images. In some embodiments, a plurality of cameras may be used to generate stereoscopic or three-dimensional images. In some embodiments, a dot projector that projects a pattern of infrared or visible dots may be used in conjunction with a camera to map the topography of surfaces. In some embodiments, a detection and ranging component utilizing radio waves (radar), sound waves (sonar), or light waves (lidar) may be used to map the location, size, and velocity of objects.

SUD sensing sub-systems can also comprise sensors that do not rely on imaging. In some embodiments, tag or beacon location determined by Bluetooth low energy, active radio-frequency identification (RFID), or passive RFID may used to determine to locate and identify occupants carrying tags or beacons and/or to locate and identify high-risk objects and equipment. In some embodiments, door switches provide an indication that people will or have entered or exited the space. In some embodiments, an audio microphone is used to detect sounds; in some embodiments, multiple audio microphones may be used to detect and locate the sources of sounds. In some embodiments, a photocell or similar light detector indicates whether the lights in a space are turned on or off. In some embodiments, an ultraviolet light detector measures reflected and scattered ultraviolet light; in some embodiments, signal from an ultraviolet light detector may be analyzed against the modulation frequency and phase of modulated SUD light sources to determine which SUD light sources are contributing to reflected and/or scattered ultraviolet light.

In some embodiments, a plurality of sensors and/or sensor technologies may be used in the sensing sub-system. In some embodiments, the components of a SUD sensing sub-system may be integrated into a single fixture; in other embodiments, a SUD sensing sub-system is constructed with sensors distributed in space to aid in occupant detection. In some embodiments, multiple SUD sensing sub-systems in the same or adjacent spaces combine their data or processed information to aid in occupant detection.

Data and information from other systems may be used to improve occupant detection performance or expand capabilities. In some embodiments, occupant detection information from outside the addressable space of the SUD system may track occupants before they enter the addressable space and after they leave the addressable space. In some embodiments, signals from call buttons, medical monitoring equipment, and other related alerts may warn of impending occupancy and activity in a space.

The disclosed embodiments are not an exhaustive list of sensing technologies that may be used in a SUD sensing sub-system and those of ordinary skill in the art will know variations in the disclosed sensing technologies that are consistent with the structure and utility described in this document.

Information

Data from the one or more sensing technologies embodied in a SUD sensing sub-system are then typically processed to provide information to the SUD control sub-system related to locating occupants within a space. In some embodiments, the SUD sensing sub-system provides occupancy information to the control sub-system, i.e. whether an area does or does not have a current detectable occupant in it. In some embodiments, the SUD sensing sub-system provides information on individual occupants that includes their location within the space, their size, and/or their velocity. In some embodiments, occupants may be identified using information derived from tag, beacon, sound, and/or image data. In some embodiments, occupants may be identified and tracked locally as a unique individual, but with no determination of personal identity.

SUD sensing sub-systems may determine additional information beyond occupancy. In some embodiments, data collected by one or more sensing technologies embodied in a SUD sensing sub-system are processed to provide information on the location, size, reflectivity, and/or density of objects and surfaces in the space. In some embodiments, tag and/or beacon data may locate and identify objects of interest. In some embodiments, thermal imaging and/or tag or beacon information may provide HIPAA-compliant means for human behaviors monitoring and critical asset tracking.

5. Control Sub-Systems

SUD control sub-systems control what areas are selected and how they are irradiated, i.e. when they are irradiated, for how much time, and at what wavelength, intensity, and/or duty cycle. Control algorithms may incorporate information including the past, present, and projected position of occupants, the location of high-touch or high-risk surfaces requiring frequent disinfection, objects and areas that should not be irradiated, and other relevant information.

Information Sources

SUD control sub-systems integrate information from SUD sensing sub-systems, and in some embodiments one or more other sources of data or information, to determine which areas can be safely irradiated, apply control algorithms or related processes to determine which areas to irradiate at any given time, and direct one or more of the controllable ultraviolet light sources to irradiate the selected areas.

SUD control sub-systems can also utilize additional information. In some embodiments, high contamination risk events may be detected by the sensing sub-system, e.g. coughing, sneezing, medical crash, intubation, touching surfaces, etc, and trigger disinfection of the addressable space or the highest risk areas. In some embodiments, high-risk areas may be identified by tags, beacons, and/or by a combination of information that may include one or more of occupant tracking, occupant identification, and high-risk event detection.

SUD systems may also be integrated with information from other systems. In some embodiments, schedule and event information is used to trigger disinfection, e.g. before a scheduled exam, after conventional terminal cleaning, after high contamination risk procedures such as intubation or patient transfer, etc. In some embodiments, equipment information is used to trigger disinfection after personnel use, e.g. a workstation, a piece of medical equipment, etc. In some embodiments, building control systems information such as occupancy, climate measurement, heating ventilation air-conditioning (HVAC) control, and/or lighting control may also be used to determine when and how to irradiate a space.

SUD systems may feature manual controls and programmability. In some embodiments, manual controls are constructed so that an operator or occupant may initiate, interrupt, or redirect irradiation as needed for safety, effectiveness, or other reasons. In some embodiments, the location of objects and irradiation parameters of specific areas and objects may be programmed into the SUD system. In some embodiments, the operating mode, frequency, timing, irradiating fluence and/or wavelength, speed, occupant detection sensitivity, and other parameters important to the operation of the SUD may be programmed into the SUD system.

The disclosed embodiments are not an exhaustive list of sensing and event information sources that may be used by a SUD control sub-system and those of ordinary skill in the art will know variations in the disclosed technologies that are consistent with the structure and utility disclosed in this document.

Locations

SUD control sub-systems may also determine what areas and corresponding air volumes are safe to irradiate, i.e. do not have a current or impending occupant in them. The ability to detect occupants and objects, select areas and air volumes that are safe to irradiate, and capably irradiate the selected areas requires knowing the locations and orientations of SUD system components, especially the controllable disinfecting light sources and sensors.

In some embodiments, SUD component locations and orientations may be programmed into the SUD control sub-system and/or the individual components.

In some embodiments, SUD component locations and orientations may be determined by modern high accuracy global positioning system devices (L5) or a related wireless system for determining location and orientation.

In some embodiments, SUD component locations and orientations may be determined by wireless tag, beacon, and/or emitter location system.

In some embodiments, SUD component locations and orientations may be determined by analyzing locator sounds emitted by each component with one or more multiple microphone arrays located in positions that are known to the SUD system.

In some embodiments, SUD component locations and orientations are determined by a location-aware robot or drone.

In some embodiments, SUD component locations and orientations are determined by a camera from a known position in the space.

In some embodiments, SUD light source locations and orientations are determined by imaging a plurality of emitted beam directions from the SUD light sources.

In some embodiments, SUD sensor locations and orientations are determined by sensing and locating a signal emitted from a known location in the space.

In some embodiments, a plurality of the disclosed structures and methods for determining the location and orientation of SUD components are used together.

Operating Behavior

The primary objective of a SUD system is to disinfect a space as fully as possible, while minimizing the ultraviolet light exposure to occupants. The operating behavior of a SUD system is directed from the SUD control sub-system. Depending on the implementation of specific embodiments of the control sub-systems and the capabilities of the disinfecting light sources and sensing sub-systems, there are many possible operating behaviors of a SUD system.

In some embodiments, a SUD system disinfects a space when no occupants are detected.

In some embodiments, a SUD system disinfects the upper air volume of a space.

In some embodiments, a SUD system disinfects a space while avoiding irradiation of one occupant who is substantially stationary for an extended period of time, e.g. a patient resting in a hospital bed, a single sitting occupant, etc.

In some embodiments, a SUD system disinfects a space while avoiding direct irradiation of multiple occupants that are substantially stationary for an extended period of time, e.g. a patient resting in a hospital bed with visitors nearby, multiple seated occupants, etc.

In some embodiments, a SUD system disinfects a space while avoiding direct irradiation of one or more occupants moving in the space.

In some embodiments, a SUD system disinfects a space after high-risk events occur, e.g. touching, coughing, sneezing, medical crash, intubation, etc; in some embodiments, the areas immediately adjacent to a located high-risk event are disinfected first.

In some embodiments, a SUD system disinfects identified high-risks areas frequently when they are not occupied and/or shortly after they have been occupied.

In some embodiments, a SUD system disinfects identified high-risks objects frequently when they are not in use and/or shortly after they have been used.

In some embodiments, a SUD system tracks one or more occupants engaged in terminal cleaning activity and irradiates areas that have already been cleaned by the occupants, while avoiding irradiation of the occupants.

In some embodiments, a SUD system tracks the location of important pieces of equipment marked with a tag or beacon.

In some embodiments, a SUD system uses thermal imaging information to determine if occupants have a fever.

In some embodiments, a SUD system uses imaging and/or sound information to detect accidents or distress, e.g. a person experience seizure, choking, shortness of breath, fall, etc.

In some embodiments, a SUD system tracks the movements of an occupant to help confirm that desired procedures are followed, e.g. that people who enter a room disinfect or clean their hands, that visitors disinfect or clean their hands before and/or after being near a patient, that persons are seen to place gloves on their hands or don other personal protective equipment, that people who are detected to cough or sneeze then subsequently clean their hands, etc.

In some embodiments, the operating behavior of a SUD system will comprise a plurality of the disclosed embodiments.

The disclosed embodiments are not an exhaustive list of operating behaviors of SUD systems comprised of controllable ultraviolet light sources, sensing sub-systems, and control sub-systems and those of ordinary skill in the art will recognize additional variations and combinations of the listed operating behaviors that are consistent with the structure and utility described in this document.

6. Interconnections

There are many combinations and interconnections of SUD system components possible to meet specific application or product requirements.

In some embodiments, a SUD system is self-contained, with one or more SUD light sources, one or more SUD sensing sub-systems, and one or more SUD control sub-system connected in one enclosure.

In some embodiments, a SUD system is distributed across multiple enclosures. A plurality of sensors connected to one SUD sensing sub-system can be placed in different locations in a space to improve sensor coverage and/or add capabilities. A plurality of SUD light sources connected to one SUD control sub-system can be placed in different locations in a space to decrease disinfecting cycle time, improve irradiation coverage across the space and/or around obstacles, and/or add capabilities.

In some embodiments, a plurality of SUD systems share information and instructions between their respective SUD sensing sub-systems, SUD control sub-systems, and/or SUD light sources to improve their overall performance, capabilities, and/or coverage area.

In some embodiments, a SUD sensing sub-system is connected to one SUD control sub-system and/or SUD light source. In some embodiments, a SUD sensing sub-system is connected to a plurality of SUD control sub-systems and/or SUD light sources.

In some embodiments, a SUD control sub-system is connected to one SUD sensing sub-system. In some embodiments, a SUD control sub-system is connected to a plurality of SUD sensing sub-systems.

In some embodiments, a SUD control sub-system is connected to one SUD light source. In some embodiments, a SUD control sub-system is connected to a plurality of SUD light sources.

In some embodiments, a SUD light source is connected to one SUD control sub-system. In some embodiments, a SUD light source is connected to a plurality of SUD control sub-systems.

In some embodiments, components of a SUD system are connected by wire. In some embodiments, components of a SUD system are connected wirelessly.

In some embodiments, the connections in a SUD system will comprise a plurality of the disclosed embodiments.

In some embodiments, the combinations and interconnections of components that comprise a SUD system will comprise a plurality of the disclosed embodiments.

Figure 8:
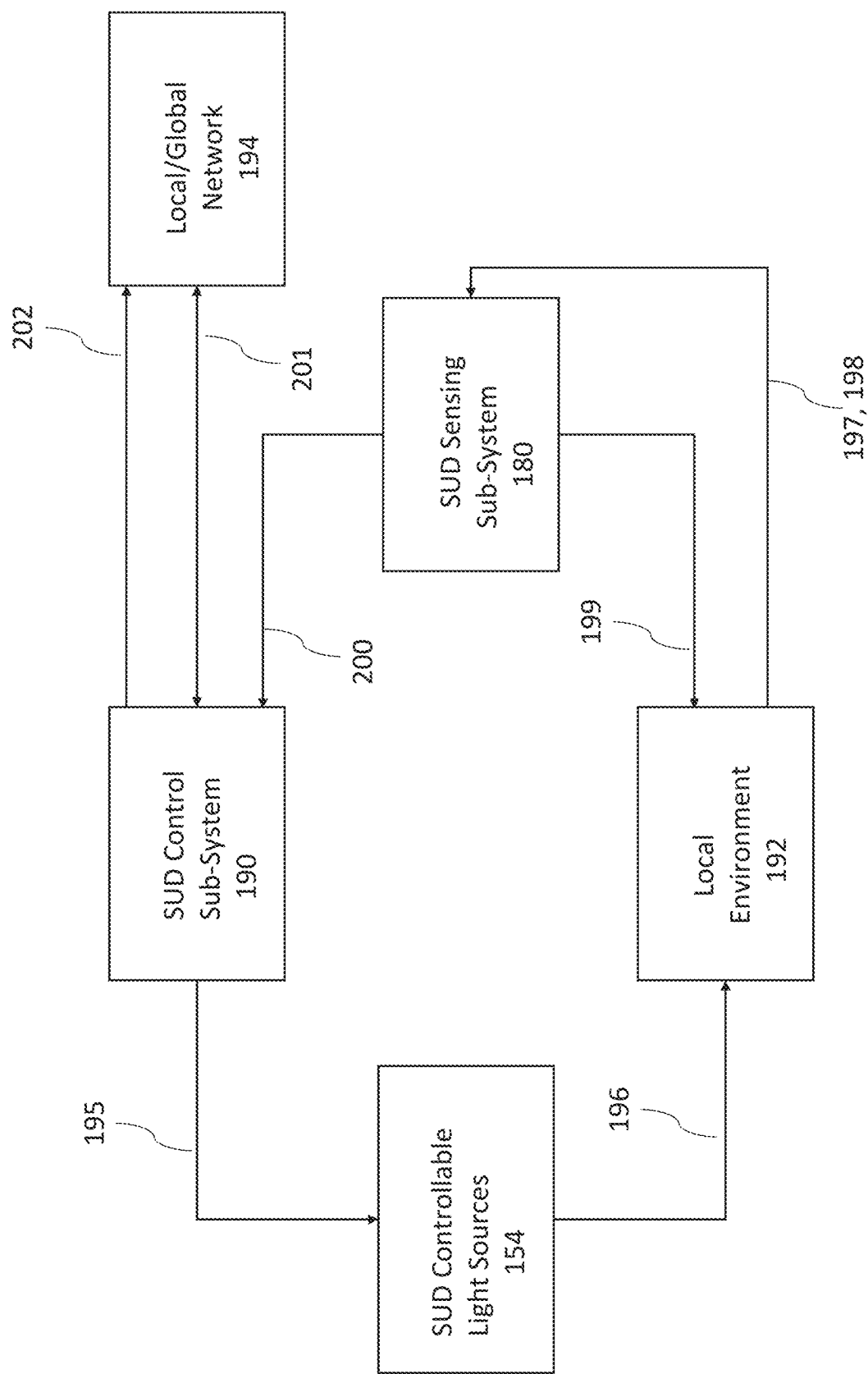
FIG. 8—Block diagram showing the components of an example SUD system and the information flow between the elements.

FIG. 8 is a block diagram of one embodiment of a SUD system comprising a combination of SUD components and the interconnections between them. An SUD sensing sub-system 180 contains one or more sensors to probe selected areas of a space, also referred to herein as the local environment 192. Active probe sensors such as dot projectors and detection and ranging components send active probe signals 199 into the local environment 192. Electromagnetic radiation 197 (including thermal, visible, and other forms) and acoustic waves 198 from the local environment 192 are sensed by the sensing sub-system 180. The environmental information 200 determined by the SUD sensing sub-system 180 is passed to the SUD control sub-system 190. The SUD control sub-system 190 also exchanges external control signals 201 from the external network 194, for example regarding other building systems such as HVAC, security, or room equipment. The external control signals 201 may also originate from external information technology systems. The SUD control sub-system 190 also sends SUD system information 202 to the external network 194, for example regarding SUD system status and schedule. The control sub-system 190 uses the received input information and its internal algorithms to determine selected-areas for irradiation over time and sends the appropriate control signals 195 to the SUD controllable light source(s) 154 at each moment so that the SUD controllable light source(s) 154 deliver ultraviolet light 196 to the selected-areas within the local environment 192.

7. System Embodiments

In a first system embodiment, a SUD system comprises an SUD controllable light source of the first, second, or third light source embodiments, a SUD sensing sub-system comprising a thermal sensor with an angular field of view similar to, smaller than, or larger than the field angle of the SUD light source and aligned to view the same selected-area and air volume as the SUD light source, and a SUD control sub-system that scans a space with the beam of the SUD light source but interrupts the beam irradiation when a heat source consistent with a living occupant is detected by the thermal sensor in the selected area of the SUD light source. Beam irradiation can be interrupted by turning off power to the light emitters, actuating a shutter or other beam blocking mechanism to block the beam, or another mechanism to prevent the SUD light source from irradiating the selected area. The SUD control sub-system can scan the room in a regular raster pattern, a pattern of expanding or contracting circles or polygons, or other such regular pattern that can address a space. The SUD control sub-system can initiate scans of the space based on manual input by a user, programmed times and dates, or other inputs.

Figure 9:
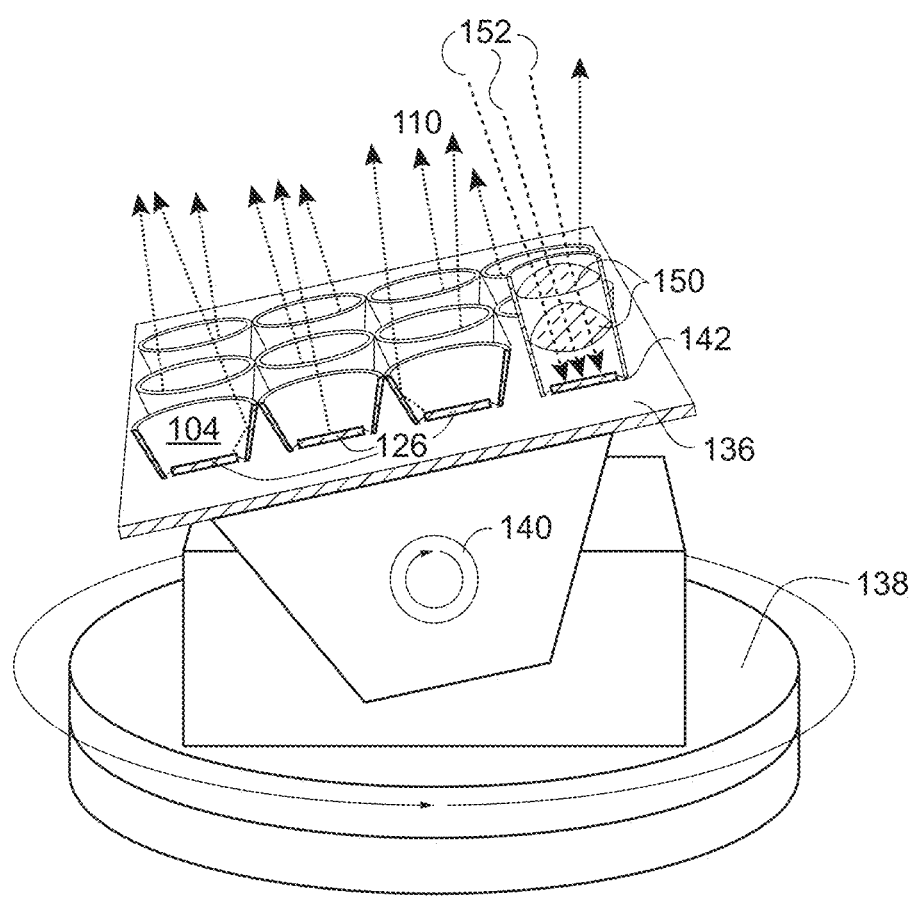
FIG. 9—Perspective view of an SUD system with a SUD light source with first-surface reflector collimators (shown in cutaway cross-section in the front row) and a thermal sensor (also shown in cutaway cross-section), mounted on a common pan-tilt stage.

FIG. 9 shows an example implementation of the first system embodiment. The SUD light source of FIG. 4B is further fitted with a thermal sensor 142 mounted on the moving platform 136 so that its field of view is always aligned to the direction of the output light beam 110. The thermal sensor 142 may optionally include lens elements 150, as shown, in order to focus thermal radiation 152 onto the sensor and define the sensor field of view.

Figure 10:
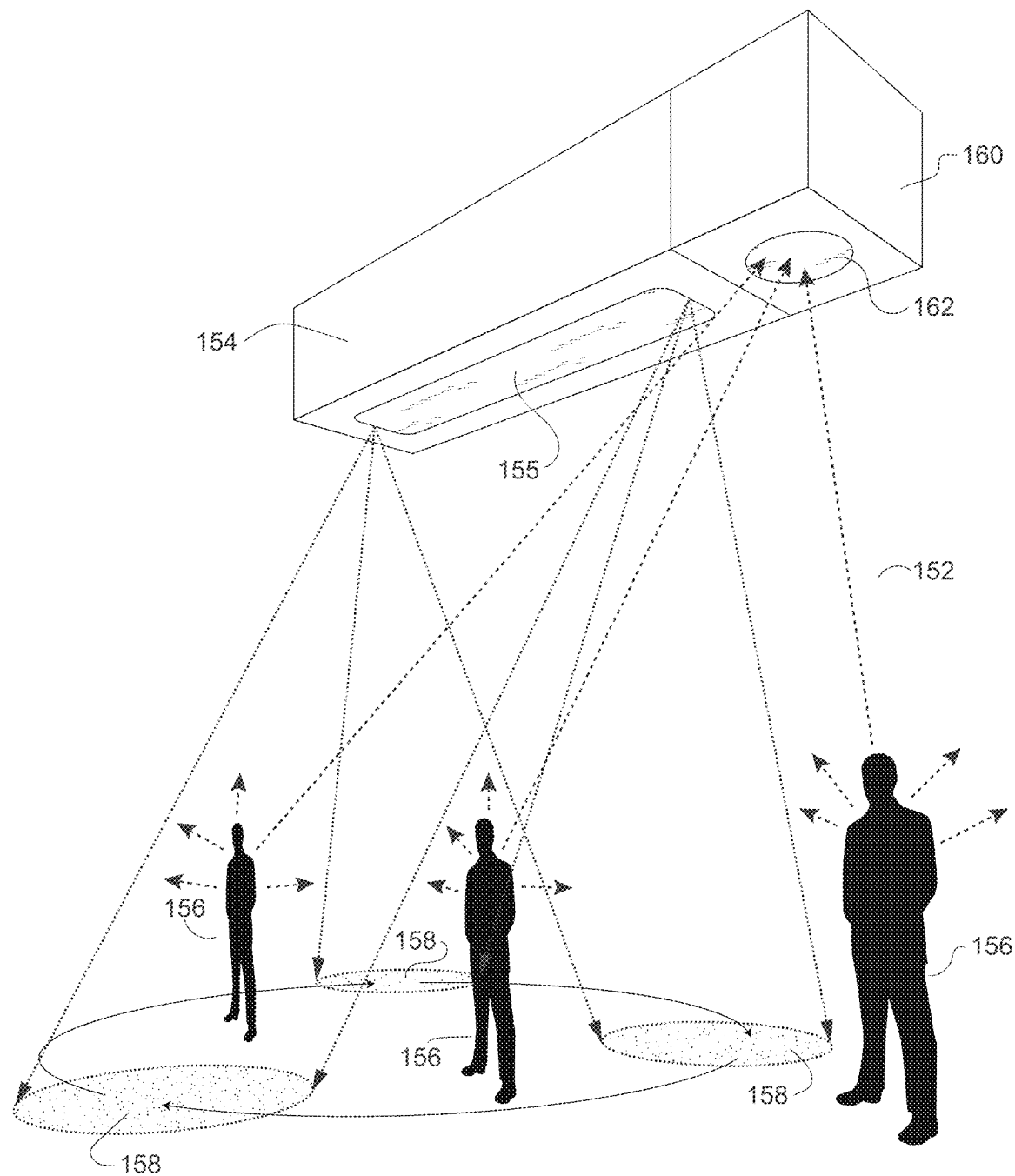
FIG. 10—Illustration of an SUD system with a thermal camera sensor that scans an ultraviolet beam in a path that avoids occupants.

FIG. 10 shows an example implementation of a second SUD system embodiment, comprising a SUD light source 154 of the first, second, or third light source embodiments, a SUD sensing sub-system comprising a thermal camera 160, and a SUD control sub-system (not shown in FIG. 9) that scans a space with the moving beam 158 of the SUD light source while avoiding heat sources detected by the thermal camera 160. Room occupants 156 are heat sources emitting thermal radiation 152, some of which strikes the thermal sensor input 162. A heat source can be avoided by directing the beam to scan around the heat source or by shuttering or turning off the beam when the light source is aimed at the heat source. The SUD control sub-system can scan the room in a regular raster pattern, a pattern of expanding or contracting circles or polygons, or other such regular pattern that can address a space. The SUD control sub-system can initiate scans of the space based on manual input by a user, programmed times and dates, or other inputs and can interrupt or postpone scans of the space if the total number or area of heat sources exceeds a programmed threshold.

Figure 11:
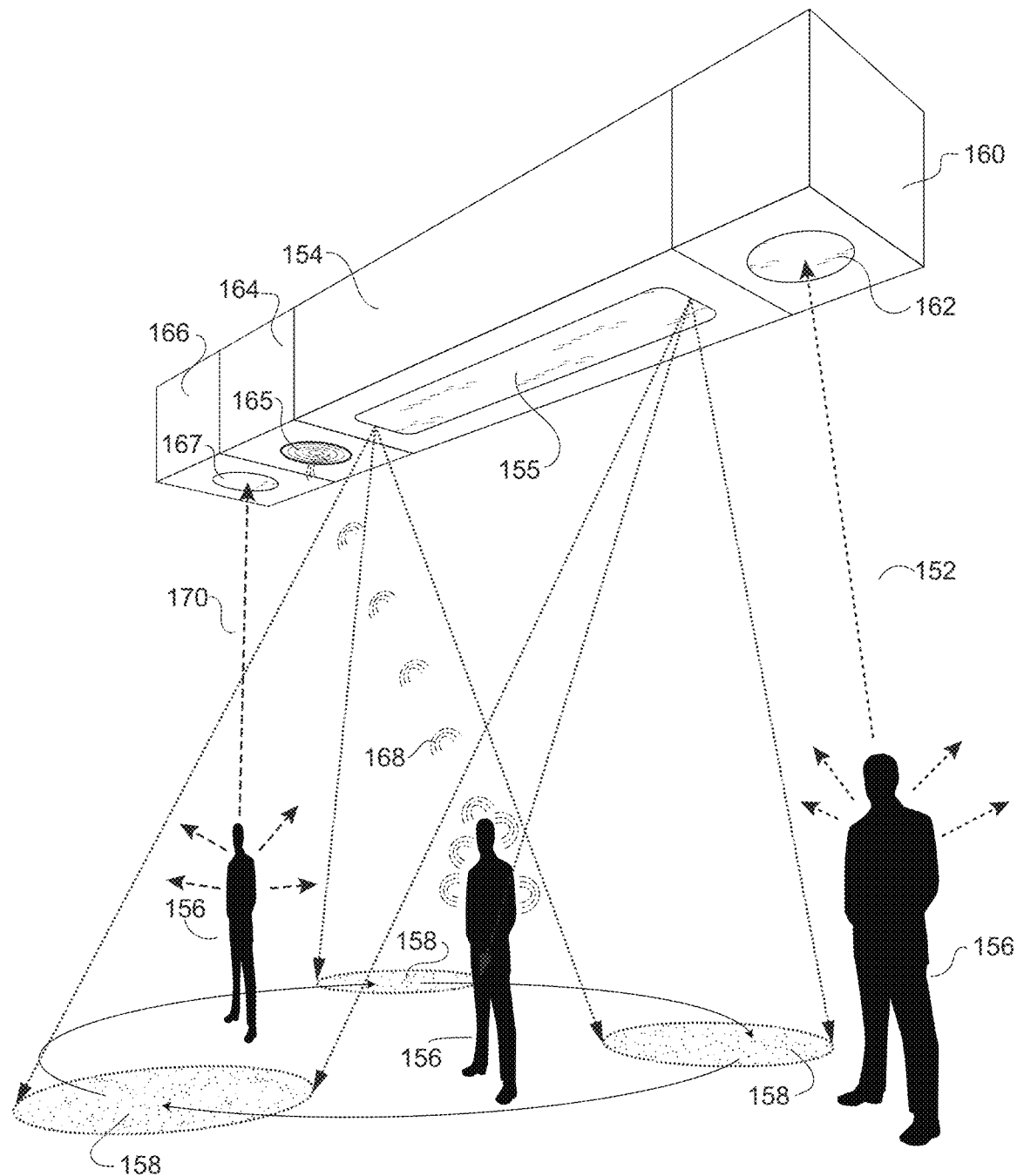
FIG. 11—Illustration of an SUD system with a thermal camera sensor, a visible-light camera sensor, and a sound wave sensor, that scans an ultraviolet beam in a path that avoids occupants.

FIG. 11 shows an example implementation of a third SUD system embodiment, comprising a SUD light source 154 of the first, second, or third light source embodiments, a SUD sensing sub-system comprising a thermal camera 160, visible-light camera 166, and sound sensor 164, and a SUD control sub-system (not shown in FIG. 10) that scans a space with the beam 158 of the SUD light source while avoiding occupants 156 detected and tracked by the sensing sub-system. The visible-light camera receives visible light 170 from occupants 156 or other room elements at its sensor input 167. The sound sensor 164 receives acoustic waves 168 at its sensor input 165. The SUD control sub-system can direct the SUD light source to scan the room in a regular pattern while avoiding occupants and/or it can direct the SUD light source to first disinfect high-risk areas that are programmed or detected in the SUD control sub-system while avoiding occupants. In some variations of the third system embodiment, the fluence rate of the SUD light source is varied by changing the beam field angle with an adjustment mechanism or the operating power of the light emitters in response to a programmed pattern or to increase the disinfection degree or rate of detected high-risk areas.

Figure 12:
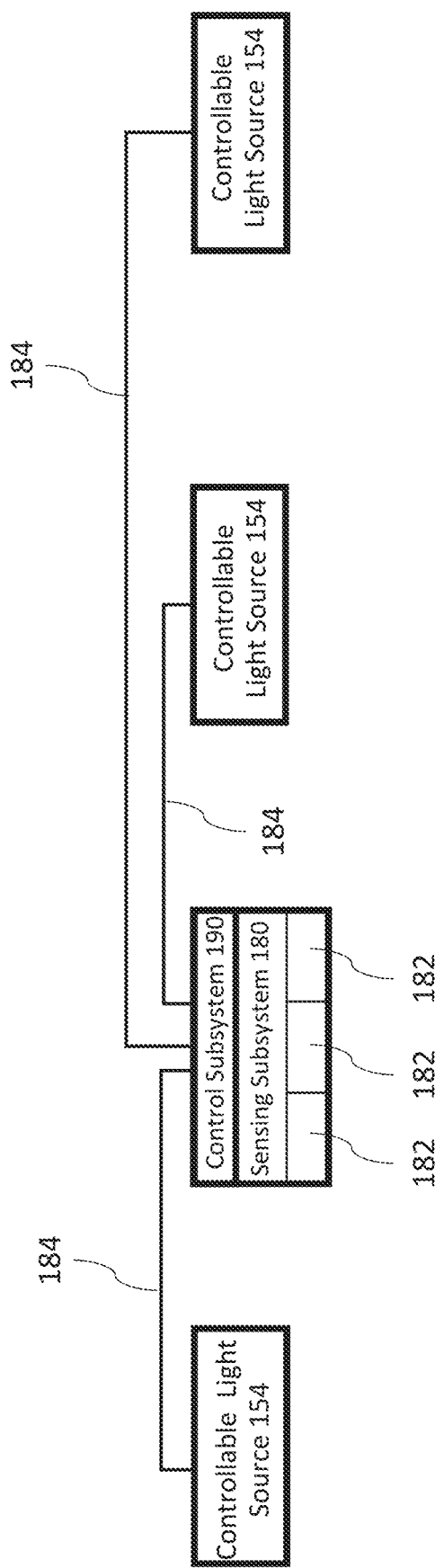
FIG. 12—Block diagram showing an SUD system comprising a plurality of SUD light sources and a sensing sub-system with a plurality of sensors.

FIG. 12 shows an example implementation of a fourth SUD system embodiment, comprising a plurality of SUD controllable light sources 154 of the first, second, and/or third light source embodiments, a SUD sensing sub-system 180 comprising one or more sensors 182 such as thermal cameras, detecting and ranging components, and/or a dot projector and infrared camera, and a SUD control sub-system 190 that scans a space (also referred to herein as the local environment, but not shown in FIG. 12) with the beams of the SUD light sources 154 while avoiding occupants detected by the sensing sub-system. The SUD control sub-system 180 uses information from the dot projector and infrared camera and/or detecting and ranging components to determine the shape and location of non-living objects in the room and directs the SUD light sources 154 via wired or wireless communication channels 184 to irradiate the objects from a plurality of directions to increase the area and degree of disinfection on the objects.

Figure 13:
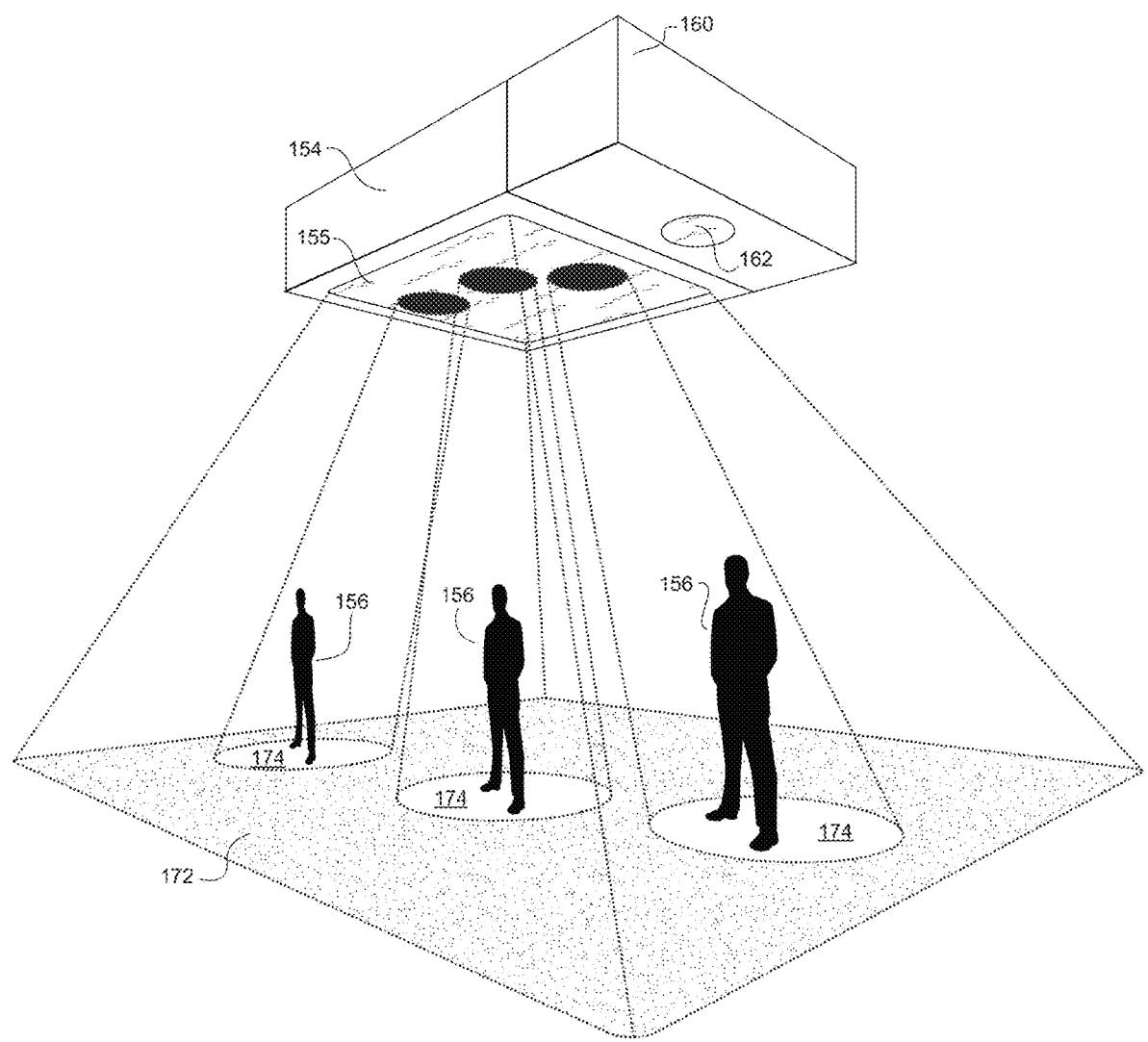
FIG. 13—Illustration of an SUD system comprising a SUD light source and a thermal camera to detect occupants. The SUD light source emits beams that blanket an area but leave occupants within a selected area non-irradiated.

FIG. 13 shows an example implementation of a fifth SUD system embodiment, comprising a SUD light source 154 of the third light source embodiment with a plurality of SUD light emitters and collimators, a SUD sensing sub-system comprising a thermal camera 160, and a SUD sub-control system that directs the SUD light source to irradiate the space 172 except those areas 174 that are occupied by occupants 156. In a SUD light source of the third light source embodiment, a substantial number of the SUD light emitters can be powered such that many desired selected areas are irradiated concurrently while SUD light emitters corresponding to areas and air volumes with an occupant present are not powered.

8. Control Subsystem Embodiments

The control subsystem or control module comprises circuitry for (a) operating and directing the one or more disinfecting light sources to irradiate selected areas, (b) operating the one or more sensing sub-systems to detect the location of occupants in a space, and (c) performing the various other functions of the SUD system as described elsewhere herein.

The embodiments of the processors described herein may therefore utilize executable instructions embodied in a non-transitory computer readable medium, including, without limitation, a storage device or a memory area accessible to the processors. Such instructions, when executed by the one or more processors, cause the processor(s) to perform at least a portion of the methods described herein. As used herein, a "storage device" is a tangible article, such as a hard drive, a solid state memory device, and/or an optical disk that is operable to store executable instructions and data.

It should be noted that processors described herein may include one or more processing units (e.g., in a multi-core configuration). Further, the processors described herein may be implemented using one or more heterogeneous processor systems in which a main processor is present with secondary processors on a single chip. As another illustrative example, the processors may be a symmetric multi-processor system containing multiple processors of the same type. Further, the data processors may be implemented using any suitable programmable circuit including one or more systems and microcontrollers, microprocessors, signal processors, reduced instruction set circuits (RISC), application specific integrated circuits (ASIC), programmable logic circuits, field programmable gate arrays (FPGA), fixed logic circuits, or any other circuit capable of executing the functions described herein. Additionally, the processors may perform partial processing and receive partial processing by still other processors and/or computing devices communicatively coupled to the processors such as via a network connection.

Although specific features of various embodiments may have been shown in some drawings and not in others, this was for convenience only. In accordance with the principles described herein, any feature of a drawing may be referenced and/or claimed in combination with any feature of any other drawing.

The disclosed embodiments are not an exhaustive list of the construction and utility of SUD systems. Those of ordinary skill in the art will recognize additional useful variations and/or combinations of the disclosed system embodiments and other embodiments that are consistent with the structure and utility disclosed herein. This written description has therefore used examples to disclose various embodiments, which include the best mode to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A light source comprising an array of two or more optical assemblies each comprising
   (i) a transparent solid optic with a planar side and a convex side, and
   (ii) a front surface reflector separated from the convex side of the solid optic by a narrow air gap, and
   a corresponding array of light emitters, each held in proximity to the planar side of the corresponding solid optic, wherein
   light emitted by each light emitter enters the corresponding optic, is reflected by the corresponding front surface reflector, and then exits the planar side of the corresponding optic and forms a beam with a predetermined ray angle distribution; and
   wherein the direction of each of the beams is determined by a position of the corresponding light emitter relative to the optical axis of the corresponding optical assembly, within the focal plane of the optical assembly; and
   wherein at least some of the optical assemblies in the array of optical assemblies are differently positioned relative to the corresponding light emitters, such that the light emitters are not all located in a constant relative position with respect to an optical axis of the corresponding optical assembly, so that the beams are emitted in a variety of directions.

2. A light source comprising an array of one or more optical assemblies each comprising
   (i) a transparent solid optic with a planar side and a convex side, and
   (ii) a front surface reflector separated from the convex side of the solid optic by a narrow air gap, and
   a corresponding array of light emitters, each held in proximity to the planar side of the corresponding solid optic, wherein
   light emitted by each light emitter enters the corresponding optic, is reflected by the corresponding front surface reflector, and then exits the planar side of the corresponding optic and forms a beam with a predetermined ray angle distribution; and
   wherein the direction of each of the beams is determined by a position of the corresponding light emitter relative to the optical axis of the corresponding optical assembly, within the focal plane of the optical assembly; and
   further comprising an actuation system that can move the array of optical assemblies relative to the array of light emitters in directions parallel to the focal plane.

3. The light source of claim 2 wherein the beam has a field angle in one of the following ranges: (i) greater than 40° and less than 180°, (ii) greater than 4° and less than 40°, (iii) greater than 7° and less than 20°.

4. The light source of claim 2 wherein each light emitter comprises one or more light emitting diodes.

5. The light source of claim 2 wherein the actuation system is motorized and further comprising an electronic control system that controls the actuation system.

6. The light source of claim 5 further comprising one or more sensors that measure features of the local environment and provide information to the control system, and wherein the control system adjusts the direction or intensity of the beams in response to the provided information regarding the local environment.

7. The light source of claim 6 wherein the one or more sensors are providing information that indicates the presence or position of occupants within the local environment.

8. The light source of claim 7 wherein the light emitter emits ultraviolet light capable of disinfecting surfaces or air volumes, and wherein the control system directs the beams of ultraviolet light so as to disinfect portions of the local environment while avoiding irradiating occupants.

9. A selected-area ultraviolet disinfection system comprising:
   (i) a light source comprising
   an array of one or more optical assemblies each comprising
      a transparent solid optic with a planar side and a convex side, and
      a front surface reflector separated from the convex side of the solid optic by a narrow air gap, and
      a corresponding array of light emitters held in proximity to the planar side of the optics, and
      a motorized actuation system that can move the array of optical assemblies relative to the array of light emitters in directions parallel to the focal plane wherein
   light emitted by each light emitter enters the corresponding optic, is reflected by the corresponding front surface reflector, and then exits the planar side of the corresponding optic and forms a beam with a predetermined ray angle distribution and wherein the direction of each of the beams is determined by the position of the corresponding light emitter relative to the optical axis of the corresponding optical assembly, within the focal plane of the optical assembly; and
   (ii) a sensor system comprising one or more sensors that provide information which indicates the presence or position of occupants within the local environment, and
   (iii) a control system that adjusts the direction or intensity of the beams in response to the provided information regarding the local environment in order to direct the beams so as to disinfect portions of the local environment while avoiding irradiating occupants.

* * * * *